US010678968B2

(12) United States Patent
Chen

(10) Patent No.: US 10,678,968 B2
(45) Date of Patent: Jun. 9, 2020

(54) METHOD OF VERIFYING AND ANALYZING ENERGY EFFICIENCY RATIO EER OF A HEATING VENTILATION AND AIR CONDITIONING HVAC CHILLER UNIT

(71) Applicant: Chu-Fu Chen, Taipei (TW)

(72) Inventor: Chu-Fu Chen, Taipei (TW)

(*) Notice: Subject to any disclaimer, the term of this patent is extended or adjusted under 35 U.S.C. 154(b) by 512 days.

(21) Appl. No.: 15/466,859

(22) Filed: Mar. 22, 2017

(65) Prior Publication Data
US 2017/0277816 A1    Sep. 28, 2017

(30) Foreign Application Priority Data

Mar. 22, 2016 (TW) .............................. 105108886 A

(51) Int. Cl.
| G06F 17/10 | (2006.01) |
| G06F 30/20 | (2020.01) |
| F24F 11/30 | (2018.01) |
| F24F 11/47 | (2018.01) |
| G06F 111/10 | (2020.01) |
| G06Q 50/06 | (2012.01) |

(52) U.S. Cl.
CPC .............. *G06F 30/20* (2020.01); *F24F 11/30* (2018.01); *F24F 11/47* (2018.01); *G06F 2111/10* (2020.01); *G06Q 50/06* (2013.01)

(58) Field of Classification Search
CPC ............................. G06F 17/5009; F24F 11/30
USPC .......................................................... 703/2
See application file for complete search history.

(56) References Cited

U.S. PATENT DOCUMENTS

| 10,161,834 B1 * | 12/2018 | Henry ..................... F24F 11/30 |
| 2010/0082174 A1 * | 4/2010 | Weaver ..................... H02J 3/14 |
| | | 700/295 |
| 2015/0177109 A1 * | 6/2015 | Lockhart ................ G01K 13/00 |
| | | 702/182 |

FOREIGN PATENT DOCUMENTS

| TW | 146487 | 11/1990 |
| TW | I327212 | 7/2010 |
| TW | I351499 | 11/2011 |
| TW | I365276 | 6/2012 |
| TW | I453363 | 9/2014 |

* cited by examiner

*Primary Examiner* — Andre Pierre Louis

(57) ABSTRACT

A method of verifying and analyzing energy efficiency ratio (EER) of an HVAC chiller unit in accordance with the present invention provides verification and analysis of HVAC chiller units to build daily steady-state data and non-steady state data out of field dynamic EER values and provides analysis of the steady-state data, based on selected integer temperatures and tenfold load factors in the annual scale that are subject to the dynamic changes in temperatures and load factors along with chiller seasonal operation to build monthly or seasonal running EER trend, and to determine-management index values for a period of time and to determine whether energy consumption meets specified criteria, as a basis of comparison of calculations, and resulting amplitude ratios between before and after the energy-saving improvement and of totally saved energy.

19 Claims, 30 Drawing Sheets

| 時間 | 冰水入口溫度(°C) | 冰水出口溫度(°C) | 冰水過冷度(°C) | 冷卻水入口溫度(°C) | 冷卻水出口溫度(°C) | 冷卻水溫差(°C) | kW.RT() |
|---|---|---|---|---|---|---|---|
| 2015/11/24 17:20:03 | 10.30 | 9.50 | 0.80 | 28.50 | 28.70 | 0.20 | -1.59 |
| 2015/11/24 17:21:03 | 10.30 | 9.50 | 0.80 | 28.50 | 28.70 | 0.20 | 0.00 |
| 2015/11/24 17:22:03 | 10.30 | 9.50 | 0.80 | 28.50 | 28.70 | 0.20 | 0.00 |
| 2015/11/24 17:23:03 | 10.30 | 9.50 | 0.80 | 28.50 | 28.70 | 0.20 | -3.66 |
| 2015/11/24 17:24:03 | 10.30 | 9.50 | 0.80 | 28.50 | 28.70 | 0.20 | -2.00 |
| 2015/11/24 17:25:03 | 10.30 | 9.50 | 0.80 | 28.50 | 28.70 | 0.20 | -3.89 |
| 2015/11/24 17:26:03 | 10.30 | 9.50 | 0.80 | 28.50 | 28.70 | 0.20 | -1.42 |
| 2015/11/24 17:27:03 | 10.30 | 9.50 | 0.80 | 28.50 | 28.70 | 0.20 | -1.87 |
| 2015/11/24 17:28:03 | 10.30 | 9.50 | 0.80 | 28.30 | 28.70 | 0.20 | -1.33 |
| 2015/11/24 17:29:03 | 10.30 | 9.50 | 0.80 | 28.50 | 28.70 | 0.20 | -1.33 |
| 2015/11/24 17:30:03 | 10.30 | 9.50 | 0.80 | 28.50 | 28.70 | 0.30 | -3.54 |
| 2015/11/24 17:31:03 | 10.30 | 9.50 | 0.80 | 28.50 | 28.70 | 0.20 | -3.39 |
| 2015/11/24 17:32:03 | 10.30 | 9.90 | 0.80 | 28.50 | 28.70 | 0.20 | -1.70 |
| 2015/11/24 17:33:03 | 10.30 | 9.50 | 0.80 | 28.50 | 28.70 | 0.20 | -3.78 |
| 2015/11/24 17:34:03 | 10.30 | 9.50 | 0.80 | 28.50 | 28.70 | 0.20 | -4.57 |
| 2015/11/24 17:35:03 | 10.30 | 9.50 | 0.80 | 28.50 | 28.70 | 0.20 | -1.74 |
| 2015/11/24 17:36:03 | 10.30 | 9.50 | 1.00 | 28.50 | 28.70 | 0.20 | -1.46 |
| 2015/11/24 17:37:03 | 10.50 | 9.50 | 1.00 | 28.50 | 28.90 | 0.40 | -3.38 |
| 2015/11/24 17:38:03 | 10.50 | 9.50 | 1.00 | 28.50 | 28.90 | 0.40 | -3.65 |
| 2015/11/24 17:39:03 | 10.50 | 9.50 | 1.00 | 28.50 | 28.90 | 0.40 | -3.06 |
| 2015/11/24 17:40:03 | 10.50 | 9.50 | 1.00 | 28.50 | 28.90 | 0.40 | -3.19 |
| 2015/11/24 17:41:03 | 10.50 | 9.50 | 1.00 | 28.50 | 28.90 | 0.40 | -1.15 |
| 2015/11/24 17:42:03 | 10.50 | 9.70 | 0.80 | 28.50 | 28.90 | 0.40 | -1.67 |
| 2015/11/24 17:43:03 | 10.50 | 9.70 | 0.80 | 28.50 | 28.90 | 0.40 | -1.65 |
| 2015/11/24 17:44:03 | 10.50 | 9.70 | 0.80 | 28.50 | 28.90 | 0.40 | -1.59 |
| 2015/11/24 17:45:03 | 10.50 | 9.70 | 0.80 | 28.50 | 28.90 | 0.40 | -1.65 |

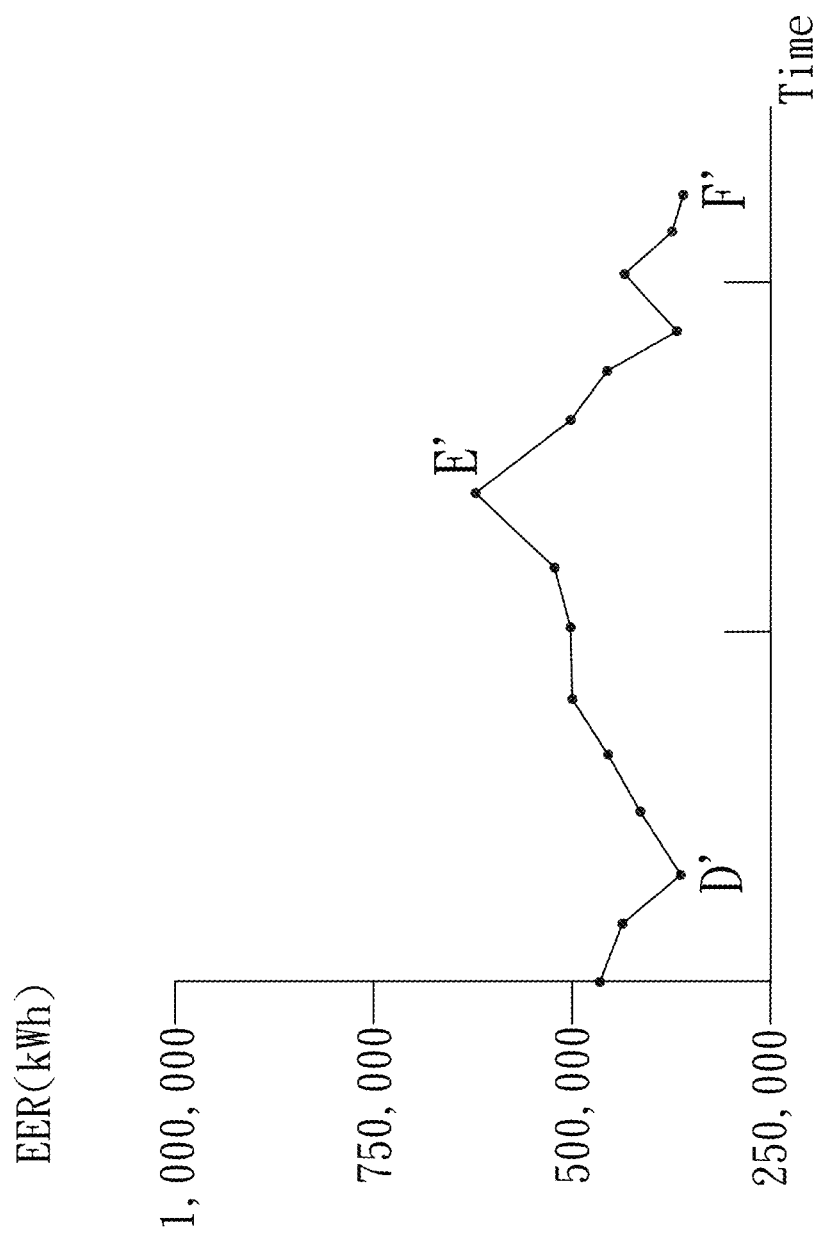

METHOD OF VERIFYING AND ANALYZING ENERGY EFFICIENCY RATIO EER OF A HEATING VENTILATION AND AIR CONDITIONING HVAC CHILLER UNIT

BACKGROUND OF THE INVENTION

1. Field of the Invention

The present invention relates generally to a method of verification and analysis and in particular to a method of verifying and analyzing field dynamic energy efficiency ratio (EER) via computer equipments including but not within programmable logic controllers (PLC), human machine interfaces (HMI) and tablet computers (Pad), etc. or any calculation, applicable to a water-cooled HVAC chiller unit comprising but not within refrigeration and freezing equipments, packaged chiller units, chiller units, brine chiller units, heat pumps, etc.

2. Related Art

In Taiwan patent applications, some provide designs in relation to an HVAC chiller unit, such as application number TW146487, TW 1365276, TW 1453363, TW 1327212 and TW 1351499, wherein the patent application TW146487 is to provide an air conditioning unit with high performance at heat dissipations. The patent application TW 1365276 is to provide a portable chiller capacity testing meter having functions of the flow meter, the electric power meter and the data collector in order to replace each of the flow meter, the electric power meter and the data collector in practical use. The patent application TW 1453363 is to provide a method of adjusting the dynamic temperature of the activated chiller unit for improving the efficiency of the chiller unit and its air conditioning unit. The patent application TW 1327212 is to provide a kind of coefficient of performance (COP) obtained by measuring and calculating the condensation and evaporation temperatures along the coolant side to verify the efficiency of the air conditioning unit. The patent application TW 1351499 is to provide a device capable of adjusting the temperature setting point of the air conditioning unit, wherein the compressor of the air conditioning unit is controlled by a signal produced in terms of temperature deviation to change the present state either earlier or later.

The patent applications above are not associated with the present invention except for TW 1365276 and TW 1327212, both of which are related to the measurement on efficiency of the air conditioning unit. Although the patent application TW 1365276 depicts the portable chiller capacity testing meter, and the patent application TW 1327212 depicts the measurement and calculation of the coolant, they fail to mention the temperature of cooling water and chilled water and brine water, the measurement and calculation of running load factors, the distinction between steady state and non-steady state for energy efficiency ratio (EER) of field dynamic operations, and the method of verifying and analyzing energy efficiency ratio (EER) of field dynamic operations. In consequence, they do not provide the steady-state numerals at fouling state during field measurement and fail to determine whether the actual energy consumption meets specified criteria. Thus, it is difficult for sellers to provide product acceptance and warranty of newly installed equipments, or measurement and energy-saving analysis of used equipments, where the improvement is needed.

The construction installation and during-operation service for the HVAC chiller unit have been restricted to manufacturing and assembly of mechanical components and motors and to breakdown maintenance. As to whether the field dynamic operation (in situ) meets EER requirements, most relevant manufacturers and all companies in the HVAC industry are not willing to work on it especially with the lack of the objective validation and analysis since they fear not cleaning up the mess in the end. The CNS Standard 12575 and AHRI Standard 550/590 (Air-Conditioning, Heating and Refrigeration Institute) provides the HVAC chiller unit with measurement of capacity and EER in constant entering water temperature and constant running load factor, wherein the load factor is determined by the percentage of the capacity of the HVAC chiller unit from total rated capacity. The steady-state EER measuring method used in a single batch with water temperature as 0° C., 24° C., 19° C. and 19° C. and corresponding running load factor as 100%, 75%, 50% and 25%, is so far used only in experimental laboratories and test stations instead of in situ. However, the HVAC chiller unit is actually of field (in situ) dynamic operation, in which the measurement is made in dynamic conditions of water temperatures and running load factors under both steady state and non-steady state. The CNS Standard 12575 and AHRI Standard 550/590 can hardly satisfy the industrial needs on this point.

In the view point of industrial and academic circles, the American Society of Heating, Refrigerating, and Air-Conditioning Engineers (ASHRAE) Guideline 14 as a method of measuring the HVAC chiller unit in situ had been introduced into the domestic market in Taiwan by the Taiwan Green Productivity Foundation before 2002 and completely done by National Taipei University of Technology thereafter. The measurement period for the Guideline 14 is about every 1~3 months. However, the correctness of the measured EER is subject to fouling factors of the HVAC chiller unit, which is an unsolved problem so far. Even if the Taiwan Green Productivity Foundation communicates and discusses with the industry for this issue, there is still no better solution, so the Guideline 14 remains not in good practice. The EER measurement made by the Department of Energy and Refrigerating Air-conditioning Engineering of National Taipei University of Technology and the Industrial Technology Research Institute is in accordance with a historical data as a reference provided by on-site operators. According to the historical data, slight changes in the actual ambient temperatures are selected by experience as a certain weather condition, instead of in terms of steady-state conditions complying with CNS Standard 12575. Running data is acquired in a rate of ten records per minute and three hundred records per thirty minutes and about thirty minutes to one hour around noon before the field measurement as a period of field operation. If the tolerance is larger than expected, then the HVAC chiller unit should be switched to manual operation mode in order to approach the steady-state condition of the CNS Standard 12575 and AHRI Standard 550/590. One temperature together with one running load factor rather than multiple temperatures and multiple running load factors need to be selected and recorded as a steady state condition depending upon variations during measurement, which is difficult to be done without sufficient experiences. Although the field running EER variations and the multiple temperatures and running load factors are already known by technical persons in the art, it is still difficult for operators to deal with most of situations unless the operators have sufficient skills and experiences. Sometimes the situations are even difficult to National Taipei University of Technology and Industrial Technology Research Institute, let alone to general operators. As a result, the technique is not commonly used in the industry nowadays.

This term fouling factor has been normalized in the CNS Standard 12575 (and even in AHRI Standard 550/590) and been known for its impact on the air conditioning capacity and EER. However, it has never been put in practical use as a parameter with the lack of the heat transfer area. According to the fouling issue, the Ministry of Economic Affairs entrusted the CTCI Foundation in 1991 with the EER measurement to 194 chillers (Scheme No. 80217). In this scheme of EER measurement, a full-time statistical value for both steady and non-steady states was adopted. A statistical result came out that the measured EER values was 1.065 kW/RT for the used HVAC chiller unit and 0.8 kW/RT for the newly installed one, which showed (1.065–0.8) ÷0.8=33.125% about 33% of difference between them. The decreasing fouling efficiency of the cooling towers were provided as an additional cross reference in this comparison to ensure that the decrease in the performance of the HVAC chiller unit was actually caused by the foulings. Afterward, the Taiwan Green Productivity Foundation was entrusted by the Ministry of Economic Affairs in 2011 with measuring EER values of 506 HVAC chiller units, which came out with the same result, i.e. the decrease in their measured EER, which was undesirable.

Accordingly, the Ministry of Economic Affairs announced the operation efficiency management of the chiller unit in 2011. The operation efficiency management of the chiller unit is directed to a method of testing the operation efficiency of the HVAC chiller unit, including (1) when testing the efficiency of the chiller unit, record a test result per minute lasting for thirty minutes or more, obtain a mean value of the test results for thirty minutes or more as a calculation basis. The tolerance of the chiller unit running load factor and the chilled water or cooling) water flow should be within ±10% regarded as in steady operation and if it is not in steady operation, the efficiency should be retested. (2) in test of the efficiency of the chiller unit, the running load factor of the chiller unit should achieve 50% or more, while the leaving chilled water temperature should be 7° C.±5° C. and entering cooling water temperature should be 30° C.±5° C. When the tolerance of the calculated cooling capacity (kw) at chilled water side and the cooling capacity (kw) at cooling water side calculated by heat balance equation is less than 10%, the field measured data is regarded as valid. This announcement relaxes the tolerance of 5% to 10% for the entering cooling water temperature 25~35° C. and the leaving chilled water temperature specified in the CNS Standard 12575. It follows that operating under steady state is an absolutely necessary. However, the content of the announcement is made only for proclaimation as instruction, instead of being in practice use for validation and analysis in relative EER values.

Furthermore, the comparative analysis of the running EER leans on the field of chemical engineering industry and lacks teaching research and develop education in the HVAC industry, so it can not be applied in field such as to the buildings. Field operation conditions keeps changing along with weather and field thermal load, which is different than an operation condition having a constant entering water temperature and a constant running load factor. In addition, the running EER is subject to fouling factors and would gradually increase along with the increase of the running days as a variable. Fouling control is of water treatment chemical industry field and the disadvantage thereof can hard be overcome merely by techniques of air conditioning industry field, which is a reason that the validation and analysis of the dynamic EER have not been proposed. Although the academic and research communities have made attempt to a few experiments to find a solution during the past 30 years, they end in failure. Although the techniques Test, Adjustment, Balance (TAB) as a high-level conditioning engineering techniques is promoted by four Associations of HVAC PEs (Professional Engineers), the TAB only involves air conditioning flow equilibrium systematically, but not an establishment of standard EER value let alone the comparative analysis of the EER value. Also, the HVAC construction engineer association does not have sufficient funds and manpowers to do further research because of vicious competition within the industry.

Note: EER measurement of the HVAC chiller unit is associated with the dynamic operation of the cooling tower, condenser, evaporator and chilled water pool, including: (1) calculating the measured water flow and the difference between entering and leaving water temperatures to obtain a condenser capacity or capacity of the HVAC chiller unit; (2) calculating $\Delta T_1 = T_{cond} - T_1$, $\Delta T_2 = T_{cond} - T_2$, wherein $T_{cond}$ is a condensing temperature of refrigerant, T1 is an entering cooling water temperature and T2 is a leaving cooling water temperature. A formula for calculating EER of the HVAC chiller unit is as follows:

$$Q = m*Cp*\Delta T = UA*\Delta T_{LM} \tag{1-1}$$

where Q is condenser capacity ($Q_{COND}$ at condenser side) or capacity of the HVAC chiller unit ($Q_{EV}$ at evaporator side); in is cooling water flow or chilled water or brine water flow; Cp is specific heat of water, 1 kcal/° C.-kg; U is total heat transfer coefficient; A is heat transfer area; $\Delta T_{LM}$ is logarithmic mean temperature difference (LMTD), calculated as follows:

$$\Delta T_{LM} = (\Delta T_1 - \Delta T_2)/(\ln \Delta T_1 - \ln \Delta T_2) \tag{2-1}$$

$$COP = Q_{EV}/kW \tag{2-2}$$

$$EER = COP*0.86 \text{(in kcal/W-h)} \tag{2-3}$$

$$kW/RT = kW/Q_{EV} (Q_{EV} \text{ in RT}) \tag{2-4}$$

Where $Q_{EV}$ is capacity of the HVAC chiller unit in kW, kcal/h, RT; kW is measured electric power; COP is coefficient of performance of the HVAC chiller unit (non-dimensional or in kW/kW); EER is energy efficiency ratio in kcal/h-W or BTU/h-W.

Further, the following formula specified in the section 7.5.3.2 of the CNS Standard 12575 is the only disclosure about the calculation of integrated part-load value (IPLV) and the IPLV is applied only in experimental laboratories and test stations as a steady state having unitary water temperature and running load factor in batches. For weight values listed below remain unknown because the Ministry of Economic Affairs has not published them, and thus the IPLV can not be successfully applied in practice. In fact, there is no precedent for field steady-state EER measurement in the industry either.

$$IPLV = WF100\% \times A + WF75\% \times B + WF50\% \times C + WF25\% \times D \tag{3}$$

where A is COP or EER for 100% refrigeration capacity; B is COP or EER for 75% refrigeration capacity; C is COP or EER for 50% refrigeration capacity; D is COP or EER for 25% refrigeration capacity; WF100% is weight factor for 100% refrigeration capacity; WF75% is weight factor for 75% refrigeration capacity; WF50% is weight factor for 50% refrigeration capacity; WF25% is weight factor for 25% refrigeration capacity. (WF100%, WF75%, WF50%, WF25% are reported by the Ministry of Economic Affairs, R.O.C.).

With the lack of the comparative analysis of the running EER in the past, ±0.5° C. was a predetermined tolerance of calibration for apparatus itself. However, for 5° C. as a difference of the leaving and entering water temperatures in full load, the tolerance ±0.5° C. in the 5° C. was actually 20% or 1.0° Q which was undesired in application. For 50% of the running load factor, the tolerance of 1.0° C. relative to only 2.5° C. temperature difference in full scale has an occupation ratio of 40% which is ridiculously high.

The biggest problem now is that the air conditioning industry field relies mainly on engineering installation and equipment operation. As to the performance of the HVAC chiller unit, construction contractors and manufacturers are rarely attempt to suggest the performance measurement as a working project because existing catalogues are already sufficient for use, and thus measurement costs in experimental laboratories and test stations are regarded as unnecessary. Besides, relevant manufacturers do not really want to develop the measurement and analysis of dynamic operation EER because (1) the field steady-state data fails to be retrieved from the dynamic data, and (2) the field water flow almost surpasses 10% or more of rated value specified in CNS Standard 12575 and AHRI Standard 550/590, which fails to meet the tolerance requirement in national standard, and (3) the techniques of fouling control does not belong to the air conditioning field and would badly affect the running EER. Therefore, relevant manufacturers or contractors would often skip or obscurely express the contract project in relation to running EER functions to avoid being unable to carry out product acceptance. Even though contractors are aware of where the problem is, they still can not solve it.

The Taiwan Green Productivity Foundation proposed a rule for energy saving in 2011. In this rule, the logarithmic mean temperature difference (LMTD) between the evaporator and the condenser in the chiller unit should be no higher than 5° C. The Taiwan Green Productivity Foundation, however, has not provided with a practical way to carry it out. Furthermore, the air conditioning industry has introduced a monitoring system to replace conventional artificial meter readings in need of being activated/shut down or operated by operators on scene. The monitoring system does not show calculations for the RT value regarded as an elementary reference in the air conditioning industry, let alone showing the comparative analysis of EER values. As an example of an air conditioning engineering project worth 100 million NTD or 3.3 million USD, the examining procedure includes merely checking equipment items and amount or quantity, but not the acceptance of capacity and running performance, not to mention energy-saving technologies for the HVAC chiller unit.

With the lack of the objective validation and analysis, there exist many defects in the determination whether the field dynamic operations of the HVAC chiller unit conform to the energy efficiency ratio (EER). Although the operation efficiency management of the chiller unit announced by Ministry of Economic Affairs in 2011 relaxed 5% to 10% of the tolerance in accordance with CNS Standard 12575, the filtering and selecting of the dynamic data has not yet been explored and developed, so it can not be used as a basis of the validation and analysis in this energy saving age. To provide the needs with better energy saving benefit, the inventor has being committed to the relevant research and development in order to solve the mentioned problems.

The present inventor has more than 30 years of experience in chemical engineering HVAC, air conditioners, computers, instrument control and value engineering industries and has registered for technical service organization as research and development sect approved by Industrial Development Bureau, the Ministry of Economic Affairs (IDB, MOEA, License No.: 09203426200, 094-R-2-23139483-0055 and 097-RD-2-23139483-0095) for further research and technology development. The present inventor had been granted for the MOEA research project sponsorship seven times from 2000 to 2009, and several research project audits during this time were satisfactory. By 30-year experience in cooperation with the National Taipei University of Technology, the Taiwan Green Productivity Foundation and the Industrial Technology Research Institute, the present inventor have provided with the chemical dynamic technology for what they lacked, which had been passed audits seven times from R&D program of the Ministry of Economic Affairs (e.g. every research project has two to five audit programs and there were 30 audits in total) and had been three times recorded as core technology. After being further developed and improved for six years (2010~2015) after the above sponsor project, the techniques finally had a breakthrough. The present invention is thus provided.

SUMMARY OF THE INVENTION

An object of the present invention is to provide a method of verifying and analyzing energy efficiency ratio (EER) of an HVAC chiller unit, which provides verification and analysis of HVAC chiller units via computer equipments including but not within programmable logic controllers (PLC), human machine interfaces (HMI) and tablet computers (Pad), etc. or any calculation, to build daily steady-state data and non-steady state data out of the field dynamic EER data in annual scale that is subject to the dynamic changes in temperatures and load factors during four seasons a year, i.e. spring, summer, autumn and winter, or a day, i.e. every morning and night, or in season or out of season mapped to business needs under both kinds of steady and non-steady states, and to determine the pre-set management index values for each week, month, season, half of a year or a year, as a basis of comparison of calculations, and resulting amplitude ratios between before and after the energy-saving improvement and of totally saved energy.

Another object of the present invention is to provide a fouling index to replace a theoretical fouling factor in order to present an effective solution of fouling description and to ensure the correctness of obtained EER values.

Another object of the present invention is to provide the owners the lowest standard of the running EER values based on the change in temperatures and load factors in the annual scale as a reference via computer equipments including but not within programmable logic controllers (PLC), human machine interfaces (HMI) and tablet computers (Pad), etc. or any calculation, thus to avoid wasting electrical power.

Another object of the present invention is to ensure the correctness of the obtained EER values with incorporation of the field operation. That is to say, to let the measured and recorded temperature differences $\Delta T$ between the entering and leaving lines of cooling water, chilled water and brine water of an HVAC chiller unit from original tolerance possibly reaching 1.0° C. go down to 0° C., which means the possible tolerance is originally 40% at 50% loading with 2.5° C. full tolerance of temperature differences $\Delta T$, or originally 20% at 100% loading with 5° C. full tolerance of temperature differences $\Delta T$.

To achieve the above objects, a method of verifying and analyzing energy efficiency ratio (EER) of an HVAC chiller unit in accordance with the present invention provides verification and analysis of HVAC chiller units via computer equipments including but not within programmable logic controllers (PLC), human machine interfaces (HMI) and tablet computers (Pad), etc. or any calculation, to determine whether an energy consumption based on the running EER values meets specified criteria. The method includes:

periodically receiving and storing the field dynamic EER data, and then building a specific integer temperature and tenfold load factor group, afterwards to obtain a corresponding consumption rate group consisting of COP, EER and kW/RT by selecting each integer temperature(s) and tenfold load factor(s), and incorporating an entering water temperature and a leaving water temperature of the HVAC chiller unit to generate the specific integer temperature(s) and tenfold load factor(s) group based on climatic conditions and running load factors of the HVAC chiller unit; taking certain percentage ranges from the specific integer temperature(s) and tenfold load factor(s) group as a selection basis to calculate standard EER values and running EER values, and storing the standard EER values and running EER values, wherein the running EER values are field measured (in situ) under fouling state; dividing one after another each of the running EER values by a corresponding standard EER value in terms of percentage in a same condition of cooling water integer temperature, tenfold load factor and chilled water or brine water (or refrigerant) integer temperature to provide a comparative analysis of the running EER values of the HVAC chiller unit to show a changing trend of the correct EER values and to determine whether the energy consumption meets specified criteria. As described above, the standard EER value refers to a value created on the installation completion date of new construction project or acid-cleaning date both of which are under no-fouling state, and the running EER value refers to a field measured value under fouling state.

Accordingly, the present invention provides a calculation of fouling index used to replace theoretical fouling factor in order to determine a fouling degree more precisely. Calculations of the fouling index in accordance with the present invention are deduced by the commonly used equation $Q=m*Cp*\Delta T=UA*\Delta T_{LM}$. The working equations of the fouling index include:

$$\text{fouling factor}(ff)=1/U_f-1/U_c; \quad (1)$$

$$\text{fouling index}(fi)=1/(UA)_f-1/(UA)_c; \quad (2)$$

$$UA=m*Cp*\Delta T/\Delta T_{LM}=Q/\Delta T_{LM}; \quad (3)$$

$$1/(UA)=\Delta T_{LM}/(m*Cp*\Delta T)=\Delta T_{LM}/Q; \quad (4)$$

where U is total heat transfer coefficient; A is heat transfer area; in is cooling water flow or chilled water or brine water flow; Cp is specific heat of water, 1 kcal/° C.-kg; $\Delta T_{LM}$ is logarithmic mean temperature difference (LMTD); Q is condenser capacity ($Q_{COND}$ at a condenser side) or capacity of the HVAC chiller unit ($Q_{EV}$ at an evaporator side); subscripts f and c represent fouling state and clean state (i.e. non fouling state), respectively; monthly UA value shows a decrease tendency in heat exchange; monthly 1/(UA) value shows an increase tendency in thermal impedance.

The method of verifying and analyzing energy efficiency ratio (EER) of an HVAC chiller unit in accordance with the present invention further provides a combination of curve sections of the running EER values illustrating a variation trend of the EER values, wherein the combination of curve sections of the running EER values comprises a curve section of agreement values before energy-saving performance improved, a curve section consisting of the running EER values plotted after energy-saving performance improved and another curve section consisting of the converted EER values for which if energy-saving performance has not been improved called a WWHH conversion meter, both the agreement value and the running EER value are the steady-state data. The combination of curve sections of the running EER values is obtained by equations as follows:

$$\%_{improved\ amplitude\ of\ each\ temperature\ and\ load\ factor}=(EER_{after\ improvement}-EER_{WWHH})\div EER_{after\ improvement}*100\% \quad (A)$$

$$\%_{daily\ improvement}=[\Sigma_{36\ values}(\%_{improved\ amplitude\ of\ each\ temperature\ and\ load\ factor})]_{average} \quad (B)$$

$$\text{Total improved electrical consumption}= \Sigma_{current\ period}(kWh_{after\ improvement}*\%_{daily\ improvement})_{selected\ day} \quad (C)$$

where $EER_{after\ improvement}$ is a daily running EER value after energy-saving performance improved; $EER_{WWHH}$ is an converted agreement value corresponding to same temperature and load factor as improved running EER value for which if energy-saving performance has not been improved; $\%_{improved\ amplitude\ of\ each\ temperature\ and\ load\ factor}$ is percentage illustrating an improvement of each temperature and load factor; $\%_{daily\ improvement}$ is percentage illustrating an average of daily improvement; $kWh_{after\ improvement}$ is total electricity consumption on a selected day after energy-saving performance improved; wherein the dynamic energy consumption rate data on a selected day before energy-saving performance improved is calculated to be the agreement value, the daily energy consumption rate data after energy-saving performance improved is calculated to be the running EER value. The agreement value and the running EER value are further compared with the converted agreement value ($EER_{WWHH}$) in the same condition of temperature and load factor as the daily running EER value ($EER_{after\ improvement}$) to obtain the improvement of each temperature and load factor ($\%_{improved\ amplitude\ of\ each\ temperature\ and\ load\ factor}$) as illustrated in the equation (A) and to obtain the average of daily improvement ($\%_{daily\ improvement}$) as illustrated in the equation (B), then the percentage ($\%_{daily\ improvement}$) being further multiplied with the total electricity consumption on the selected day ($kWh_{after\ improvement}$) to obtain the total improved electrical consumption wherein the percentage ($\%_{daily\ improvement}$) must be related to the total electricity consumption of the selected day with the percentage ($\%_{daily\ improvement}$) based on the running EER value of the selected day after improvement instead of the agreement value. By the way, the total improved electrical consumption ($\Sigma_{current\ period}$) is obtained by daily accumulations by the equation (C). As described above, each $EER_{WWHH}$ is the corresponding agreement value (point A at Curve A-B-C) in a condition of the same integer temperature and same tenfold load factor as on the date of improved running EER value (point A' at Curve A'-B'-C') and is converted and shown as point A" at Curve A"-B"-C" (shown as three points A, A', and A" in FIG. 9C). The agreement values are the EER values when the energy-saving performance has not been improved, and the $\%_{daily\ improvement}$ is percentage illustrating the average of daily improvement, so that whether an energy consumption meets specified criteria is determined depending upon the improved running EER value directed to the $EER_{WWHH}$ corresponding to the same integer temperature and same tenfold load factor as the comparison base.

In accordance with the present invention, the standard EER values in field measurements in any season of a year, or selected thirty-six combinations of the specific integer temperature and tenfold load factor group are impossible to be acquisited entirely in one time in a single day. For example, low temperatures and low running load factors may be absent during summer, high temperatures and high running load factors may be absent during winter, and high or low temperatures and high or low running load factors may be absent during spring and autumn. Therefore, the present invention thus provides an algorithm in relation to the transitive law as a technique of filling up the missing value in order to find an alternative standard EER value to replace the missing standard EER value on any selected day for the comparison with running EER values afterwards. In details, the step of filling up the missing value comprises finding the integer temperature and tenfold load factor of a missing value in the standard EER values then searching by date sequence in accordance with the specific integer temperature and tenfold load factor group for a first existing running EER value and a corresponding percentage of a date, and dividing the running EER value by the percentage of the date to obtain an alternative standard EER value which replaces the missing standard EER value of the selected day, so that the standard EER value combinations of the specific integer temperature and tenfold load factor group are provided when needed. It may be beneficial for measurement, verification and analysis on all the four seasons.

BRIEF DESCRIPTION OF THE DRAWINGS

Figure 8C:
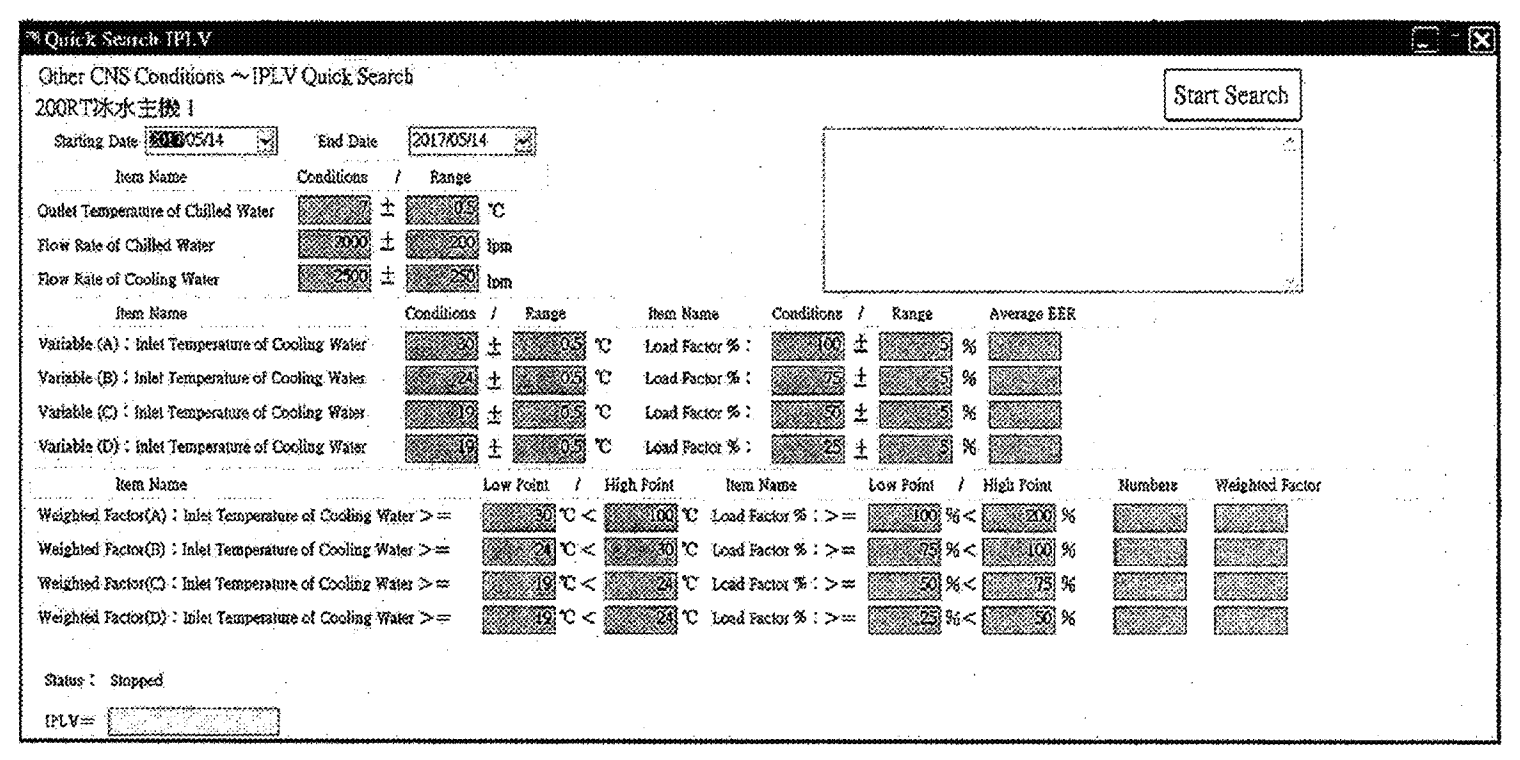
Figure 8E:
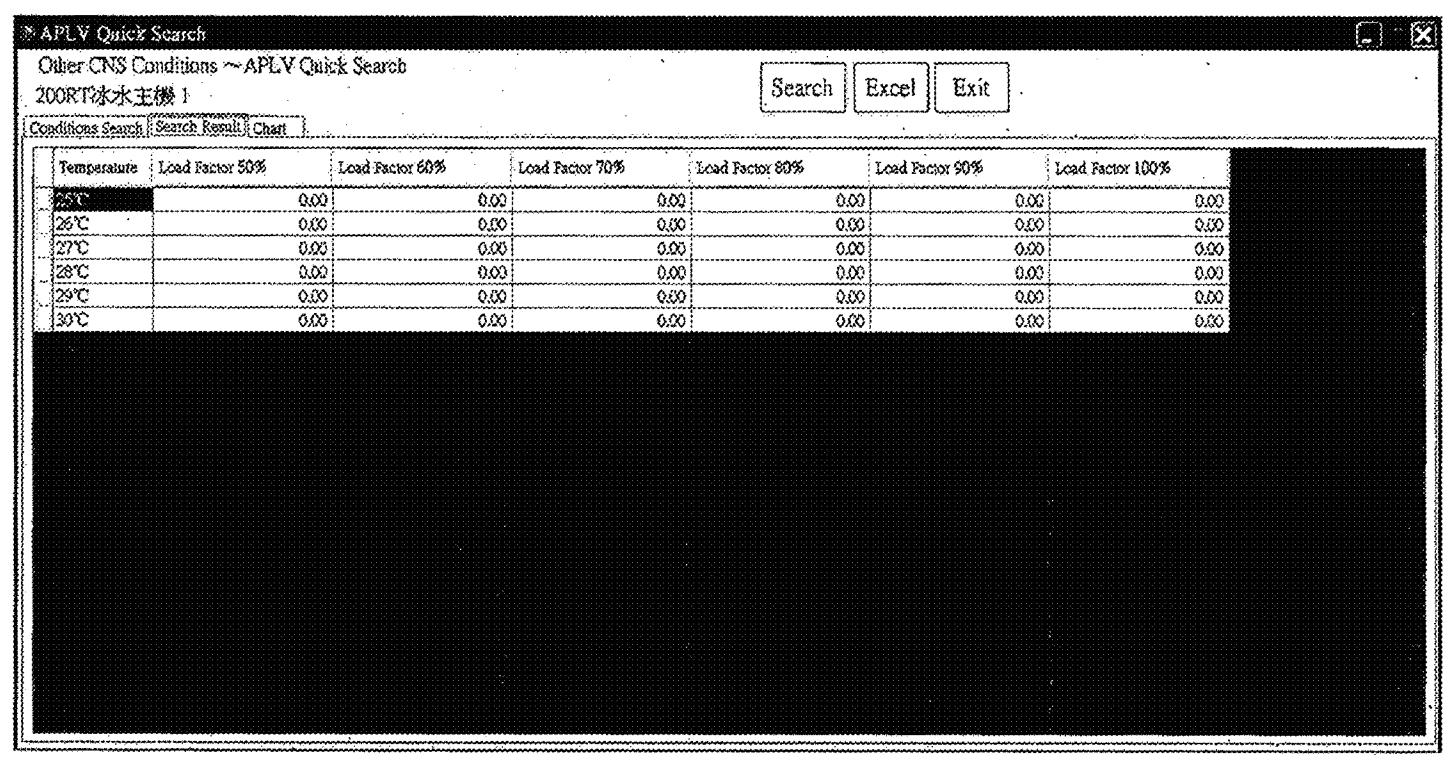
Figure 8K:
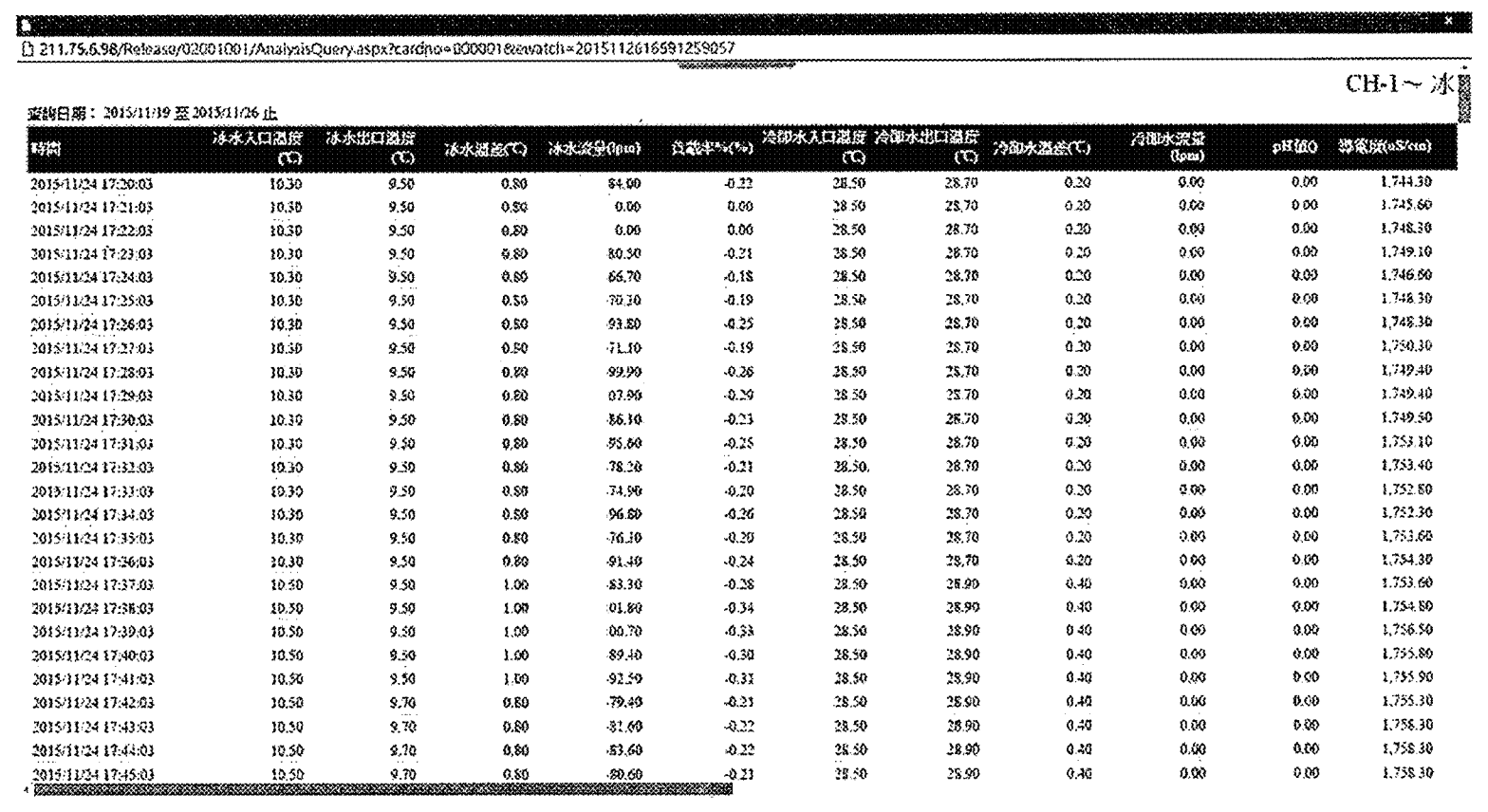
Figure 8L:
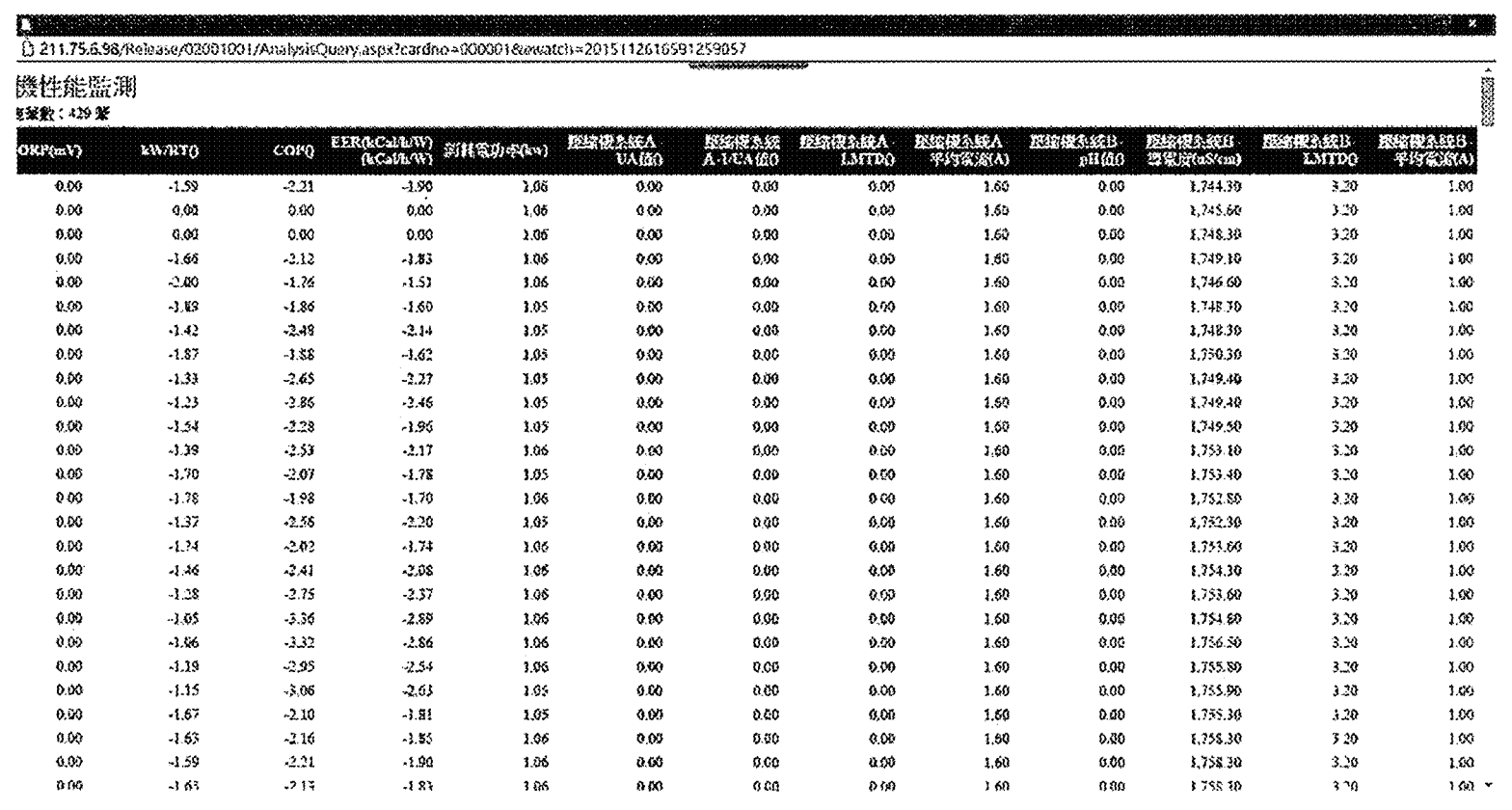

FIGS. 8A to 8L are schematic views illustrating queries and operation conditions on a user program screen in accordance with the present invention.

FIGS. 10A to 10C are line charts illustrating measurements of HVAC engineering projects in accordance with the present invention.

DESCRIPTION OF THE INVENTION

The following descriptions are exemplary embodiments only, and are not intended to limit the scope, applicability or configuration of the invention in any way. Rather, the following description provides a convenient illustration for implementing exemplary embodiments of the invention, as follows.

A method of verifying and analyzing energy efficiency ratio (EER) of an HVAC chiller unit in accordance with the present invention applies to an HVAC chiller unit of an air conditioning unit. The method is using computer equipments to build daily steady-state and non-steady state data out of the field dynamic EER that is subject to the dynamic changes during four seasons a year, i.e. spring, summer, autumn and winter, or a day, i.e. morning, noon and night, or in season or out of season mapped to business needs under both kinds of steady and non-steady state conditions, so as to provide a comparative analysis of running EER values to show a correct changing trend of the EER values in order to determine whether an energy consumption meets specified criteria, as a basis of comparison of calculations, and resulting amplitude ratios between before and after the energy-saving improvement, as well as of totally saved energy. Further, the HVAC chiller unit comprises refrigeration and freezing equipments, packaged chiller units, chiller units, brine chiller units, heat pumps, etc. The transportation of chilled water and brine water or refrigerant may be carried out by a single compressor, two compressors, or four compressors. If running data of any compressor is absent, the whole set of equipments should be considered as one unit. The computer equipments may comprise programmable logic controller (PLC), human machine interface (HMI), and tablet computer (Pad), etc. or any calculation. It is noted that the CNS/AHRI and PLV data are shown in both of the prior art and the present invention, but they have different meanings. The CNS/AHRI and PLV data in the prior art are acquisited in experimental laboratories and test stations by direct measurements and calculations. In contrast, the acquisited CNS/AHRI and PLV data in the present invention is hereby considered as dynamic running data in need of distinguishing the steady-state data and non-steady state data before calculations. Selections of the suitable place, operation mode, hardware investment and adjustment and control operation may be other possible contributing factors to make them different.

Figure 3A:
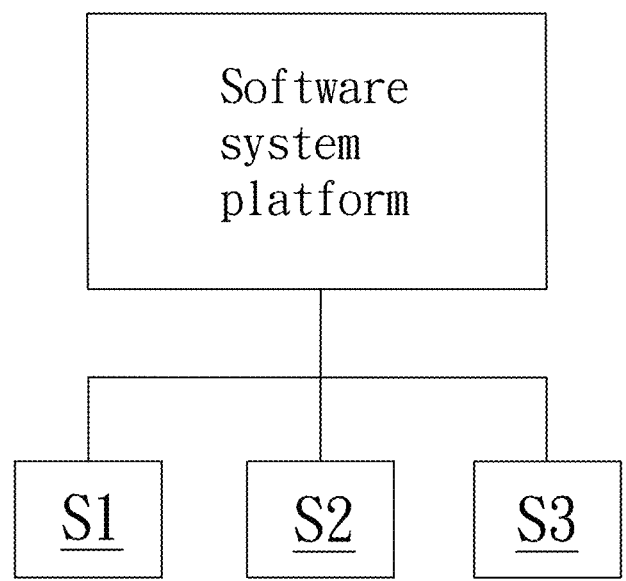
FIG. 3A is a block diagram of software system platform in accordance with the present invention.

The method provides a software system platform having independent database for each HVAC chiller unit as shown in FIG. 3A where the comparative analysis of obtained EER values refers to the comparative analysis of running efficiency and energy consumption of the HVAC chiller unit, and where the comparative analysis of obtained EER groups for multiple HVAC chiller units in the chiller room of a building refers to a comprehensive comparative analysis of the building comprising two different kinds of combinations, i.e. one is consisting of several single HVAC chiller units and the other is consisting of several groups of the HVAC chiller units. The practical operation condition of HVAC chiller units will be initially introduced. To form the practical operation condition of HVAC chiller units, data acquisition is necessary to show real-time running EER data with a simple query function in a computer screen. The data acquisition is included in every step of the present invention whenever the data is accessed in the database of computers. The method in accordance with the present invention comprises (1) specification of integer temperatures and tenfold load factors; (2) specification of the specific integer temperature and tenfold load factor group; (3) calculation of fouling indexes; (4) specification of a rated fouling factor allowance simulation in temperature; (5) determination whether EER values are under steady state or non-steady state; (6) establishment of standard value database and running value database (including calculations and queries for standard and running values); (7) comparative analysis of standard and running values; (8) techniques for filling up missing values; (9) WWHH conversion meter; (10) unexpected value ratio; (11) calculations of IPLV, APLV/NPLV and techniques for weighted factors; (12) calculations of system database of multiple HVAC chiller units in chiller room(s); and (13) calculations of unevenness coefficient. They are described below.

The data acquisition of the present invention comprises sending a transport signal related to the practical operation condition of the HVAC chiller unit, transforming the transport signal by sensors, and connecting with computers to receive and converse the transport signal and establishing a database for the storage of the running EER values in the computers. The simple query function enables query for any single day or any seven days in a row and when checking any one of thirty items on the computer screen, the graphs are displayed and exported by Excel. The computer software used in the present invention has PC version and web version both of which are same in system architecture and different in network speed.

In the present invention, the comparative analysis of EER groups is carried out by a software system platform of the HVAC chiller unit. The software system platform comprises a data acquisition system executing the data acquisition S1, a running EER system with a simple query function S2 which presents the real-time running EER data on the computer screen, and an advanced query function S3. The data acquisition system S1 is connected with the sensors for conversion of the transport signal and enables the establishment of the database for receiving and storing the converted running EER data. The running EER system with the simple query function S2 includes the display of the real-time running EER data and the query for any single day or any seven days in a row in historical data for which the query result can be displayed in graphs based on the selection among thirty items on the computer screen, and the graphs can be Excel exported by pressing an designated key. The advanced query function S3 is of high-level techniques and similarly, the query result can be displayed in graphs based on the selection among thirty items on the computer screen, and the graphs can be Excel exported by pressing the same or different designated key. As above, the method in accordance with the present invention comprises (1) specification of integer temperatures and tenfold load factors; (2) specification of the specific integer temperature and tenfold load factor group; (3) calculation of fouling indexes; (4) specification of a rated fouling factor allowance simulation in temperature; (5) determination whether EER values are under steady state or non-steady state; (6) establishment of standard value database and running value database (including calculations and queries for standard and running values); (7) comparative analysis of standard and running values; (8) techniques for filling up missing values; (9) WWHH conversion meter; (10) unexpected value ratio; (11) calculations of IPLV, APLV/NPLV and techniques for weighted factors; (12) calculations of system database of multiple HVAC chiller units in chiller room(s); and (13) calculations of unevenness coefficient.

As known, the flow rate of a cooling water pipe or a chilled water pipe of the HVAC chiller unit is usually 1.0~1.5 m/s, and would speed up to 2.0~2.5 m/s or higher when the heat exchange rate is increased by using two or four loops of entering condensers and evaporators. The heat (before and after shut-down of the machine) is carried away only in seconds to keep the entering water temperatures consistent with the leaving water temperature. However, the response time of the temperature instrument reaching a new temperature is longer than the time of reaching the same entering and leaving water temperature. Therefore, in the present invention, the entering cooling water temperature is modified to be consistent with the leaving cooling water temperature at a time after the HVAC chiller unit is shut down or before the HVAC chiller unit is turned on in order to let the difference of the temperatures be zero, and same modification is made in the chilled water side. It is noted that when the entering and leaving cooling water temperatures reach a steady state after the HVAC chiller unit is shut down, the screen shows modification columns for the entering and leaving water temperatures of cooling water and chilled water and brine water. Both of the cooling water and chilled water and brine water need to be modified as same temperature and the database is then established based on the modified temperature. In particular, the modification of temperature tolerance is of mathematic calculation, different from the instrument index correction in the prior art, and both can not be confused with each other.

Figure 3B:
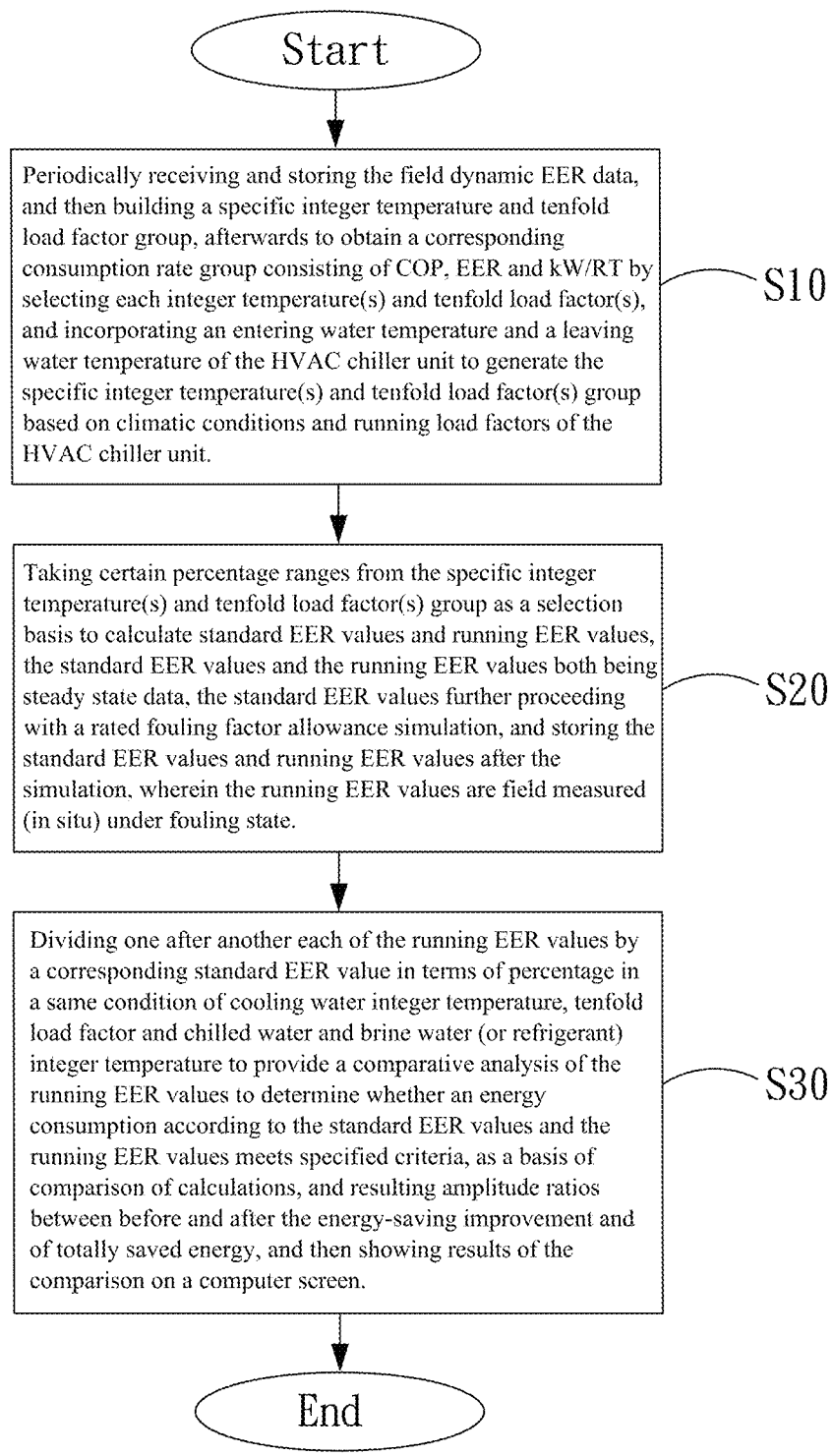
FIG. 3B is a flowchart illustrating a method of verifying and analyzing energy efficiency ratio (EER) of an HVAC chiller unit in accordance with the present invention.

With reference to FIG. 3B, which shows a preferred embodiment, a flowchart in accordance with the present invention is shown to illustrate a method of verifying and analyzing energy efficiency ratio (EER) of the HVAC chiller unit via a software. As shown, step S10 is executed first, including periodically receiving and storing the field dynamic EER data, and then building a specific integer temperature and tenfold load factor group, afterwards to obtain a corresponding consumption rate group consisting of COP, EER and kW/RT by selecting each integer temperature and tenfold load factor, and incorporating an entering water temperature and a leaving water temperature of the HVAC chiller unit to generate the specific integer temperature(s) and tenfold load factor(s) group based on climatic conditions and running load factors of the HVAC chiller unit. The term "periodically" for receiving the dynamic EER refers to receiving each dataset in relation to the dynamic EER values at 1, 2, 3, 4, 5, 6, 10, 12, 15, 20, 30 or 60 minutes intervals. The dataset in relation to the dynamic EER includes entering chilled water and brine water temperature, leaving chilled water and brine water temperature, entering cooling water temperature, leaving cooling water temperature, chilled water or brine water flow, cooling water flow, evaporating pressure, condensing pressure, pH value, electrical conductivity, ORP, amount of makeup water, daily water consumption, electric voltage, electric current, power factor, electric power consumption, customer name, host number, frequency, date, time, etc. and condenser capacity, capacity of the HVAC chiller unit, COP, EER as being metric or imperial, kW/RT and UA and 1/UA values for fouling indexes. The dataset is stored in database and displayed on the computer screen (FIGS. 8A~8L) for further query requirements.

The specific integer temperature and tenfold load factor group in this embodiment consisting of integer temperatures and tenfold load factors is established based on climatic conditions in full year (spring, summer, autumn, winter) and multiple running load factors of the HVAC chiller unit. The leaving chilled water and brine water temperature contains a combination of integer temperatures. The selected integer temperatures and tenfold load factors are organized in various number of groups with various tolerances organized in evenly and unevenly distributions. At least a common temperature for each season (spring, summer, autumn or winter) is selected with tolerance of ±1° C. That is, the selected common temperature should be an integer temperature with tolerance within ±1° C. corresponding to the entering cooling water temperature of the HVAC chiller unit. The load factors are expressed in percentages corresponding to the selected temperature. The percentages of the load factors should be selected as tenfold load factors each having tolerance within ±10%. For example, a brine chiller unit of the HVAC chiller unit obtains an integer temperature between the leaving water temperatures −7° C.~0° C. and 3° C.~15° C. (only as example to explain) with the tolerance of the selected integer temperature within ±1° C. The selected tenfold load factors are organized with the selected integer temperatures in different number of groups and tolerances. That is, the tolerances of the integer temperatures are organized in evenly and unevenly distributions. As detailed in this embodiment, the entering water temperatures indicated as integer temperatures are 25° C., 26° C., 27° C., 28° C., 29° C., 30° C., each with tolerance of ±1° C. (i.e. 1° C. or less than 1° C.). The tenfold load factors are 50%, 60%, 70%, 80%, 90%, 100%, each with tolerance of ±10%. The leaving water temperature of the brine chiller unit of the HVAC chiller unit is an integer temperature between −7° C.~0° C. and 3° C.~15° C. with tolerance of ±1° C.

The specific integer temperature and tenfold load factor group described above consists of thirty-six combinations which are calculated by the six integer entering cooling water temperatures, i.e. 25° C., 26° C., 27° C., 28° C., 29° C., 30° C. each with tolerance of ±1° C., multiplied by the one integer leaving chilled water and brine water temperature of the brine chiller unit between −7° C.-0° C. and 3° C.-15° C., e.g. 7° C. with tolerance of ±1° C., further multiplied by the six tenfold load factors, i.e. 50%, 60%, 70%, 80%, 90%, 100% each with tolerance of ±10%.

In accordance with a preferred embodiment of the present invention, the temperature, such as the entering cooling water temperature, is selected by a known positive-negative value method. In the positive-negative value method, an integer temperature may be selected as a mean value with respect to its tolerance range of ±0.5° C. For example, an integer temperature 25° C. is a mean with respect to its tolerance range from 24.5° C. to 25.4° C. The rest of integer temperatures shown in Table 1 may be deduced by analogy. Similarly, a tenfold load factor 80% is selected by the method as a mean with respect to its tolerance range from 75% to 84.9%. The rest of tenfold load factors shown in Table 1 may be deduced by analogy (see Table 1).

TABLE 1

Thirty-six combinations of the integer specific temperature and tenfold load factor group selected by positive-negative value method (or called mid-value clustering method).

| Entering cooling water temperature | Tolerance of entering cooling water temperature | Load factor | Tolerance of load factor | Leaving chilled water temperature | Tolerance of leaving chilled water temperature |
|---|---|---|---|---|---|
| 25° C. | 24.5~25.4° C. | 50 | 45~54.9% | 7° C. | 6.5~7.4° C. |
| 26° C. | 25.5~26.4° C. | 60 | 55~64.9% | | |
| 27° C. | 26.5~27.4° C. | 70 | 65~74.9% | | |
| 28° C. | 27.5~28.4° C. | 80 | 75~84.9% | | |
| 29° C. | 28.5~29.4° C. | 90 | 85~94.9% | | |
| 30° C. | 29.5~30.4° C. | 100 | 95~100% | | |

In accordance with another preferred embodiment of the present invention, the temperature is selected by a known integer method. In the integer method, an integer temperature may be selected as a minimum with respect to its tolerance range in expression of all kind of temperatures such as integer and its decimal temperatures. For example, an integer temperature 25° C. is a minimum with respect to its tolerance range from 25.0° C. to 25.9° C. The rest of integer temperatures shown in Table 2 may be deduced by analogy. Similarly, a tenfold load factor is selected by a known tenfold method. In the tenfold method, for example, a tenfold load factor 80% is selected as a minimum with respect to its tolerance range from 80% to 89.9%. The rest of tenfold load factors shown in Table 2 may be deduced by analogy (see Table 2).

TABLE 2

Thirty-six combinations of the specific integer temperature and tenfold load factor group selected by integer method and tenfold method, or minimum method.

| Entering chilled water temperature | Tolerance of entering chilled water temperature | Load factor | Tolerance of load factor | Leaving chilled water temperature | Tolerance of leaving chilled water temperature |
|---|---|---|---|---|---|
| 25° C. | 25.0~25.9° C. | 50 | 50~59.9% | 7° C. | 7.0-7.9° C. |
| 26° C. | 26.0~26.9° C. | 60 | 60~69.9% | | |
| 27° C. | 27.0~27.9° C. | 70 | 70~79.9% | | |
| 28° C. | 28.0~28.9° C. | 80 | 80~89.9% | | |
| 29° C. | 29.0~29.9° C. | 90 | 90~99.9% | | |
| 30° C. | 30.0~30.9° C. | 100 | 100% | | |

In accordance with a preferred embodiment of the present invention, compared with the previous embodiment, this embodiment differs in that the specific integer temperature and tenfold load factor group comes out with six combinations, i.e. three times one times two, based on climatic conditions of Taiwan and running load factors of the HVAC chiller unit, wherein the entering cooling water temperatures of the HVAC chiller unit are set to three integer or decimal temperatures, respectively between 25° C.~26° C., 27° C.~28° C., 29° C.~30° C., and the load factors come out with two tenfold load factors, respectively between 50%~74.9%, 75%~100% or between 50%~79.9%, 80%~100% or between 50%~69.9%, 70%~100%. The rest parts are the same.

In accordance with a preferred embodiment of the present invention, compared with the previous embodiment, this embodiment differs in that the specific integer temperature and tenfold load factor group comes out with fifteen combinations, i.e. three times one times five. In particular, the load factors come out with five tenfold load factors, i.e. 50%, 60%, 70%, 80%, 90%, thus in compliance with climatic conditions of Taiwan and running load factors of the HVAC chiller unit. In fact, according to the actual numerical computation to the air conditioning scientific charts, the difference between maximum EER and minimum EER within 1° C. and 2° C. are respectively shown as 3%~4% and 6%~8%. When the mean value is used, the tolerances are narrowed down to 1.5%~2% and 3%~4%, respectively. The tolerances of the integer temperatures and tenfold load factors are still complying with CNS Standard 12575.

In addition to above described embodiments, other various integer water temperatures and tenfold load factors such as tolerances of temperatures and load factors organized in evenly and unevenly distributions, or the temperature tolerances even down to below 25° C. or up to over 30° C. and the load factor tolerance down to below 50%, for electronics factories, chemical factories, hospitals, coolers and freezers that keep machines running for 24 hours a day and 365 days a year with no downtime, and the chilled water and brine water temperature down to below −7° C. as deep freezing or quick freezing, or the temperature and load factor tolerances within ±0.1° C.~0.4° C. and 1%~4% should be also considered in the scope of the present invention and may be categorized as dynamic data of the HVAC chiller unit capable of being used to establish standard and running values and agreement value settlement groups as reference indices.

To make sure the variation of running EER values to compare those values on the examining date with those values on specified dates in the warranty period to the end acceptance date is compliant with the requirements of project contract in an HVAC engineering project, the present invention provides a rated fouling factor allowance simulation in compliant with CNS Standard 12575 requirements in a convenient way. The rated fouling factor allowance simulation is to correct temperature tolerances of the specific integer temperature and tenfold load factor group by a factor of 0.6° C. as an rated value in accordance with CNS Standard 12575, before calculating to be a standard EER value. In other word, the fouling factor has not been applied to the field (in situ) in conventional practice, and the heat transfer area has not become an index for reference. In this regard, the present invention provides a calculation of fouling index to replace conventional fouling factor in order to determine fouling degree more precisely. Working equations of the fouling index in accordance with the present invention are deduced by the commonly used equation $Q=m*Cp*\Delta T=UA*\Delta T_{LM}$. The working equations of the fouling index include:

$$\text{fouling factor(ff)} = 1/U_f - 1/U_c; \quad (1)$$

$$\text{fouling index(fi)} = 1/(UA)_f - 1/(UA)_c; \quad (2)$$

$$UA = m*Cp*\Delta T/\Delta T_{LM} = Q/\Delta T_{LM}; \quad (3)$$

$$1/(UA) = \Delta T_{LM}/(m*Cp*\Delta T) = \Delta T_{LM}/Q; \quad (4)$$

where U is total heat transfer coefficient; A is heat transfer area; in is cooling water flow or chilled water or brine water flow; Cp is specific heat of water 1 kcal/° C.-kg; $\Delta T_{LM}$ is logarithmic mean temperature difference (LMTD); Q is condenser capacity ($Q_{COND}$ at condenser side) or capacity of the HVAC chiller unit ($Q_{EV}$ at evaporator side); subscripts f and c represent fouling state and clean state (i.e. non fouling state), respectively; monthly UA value shows a decrease tendency in heat exchange; monthly 1/(UA) value shows an increase tendency in thermal impedance.

With comparative analysis for a period of time, the obtained UA and 1/(UA) values may be graphed to explain the decrease tendency in heat exchange and the increase tendency in thermal impedance, and may be further in comparison with COP and EER. With the heat transfer area of each HVAC chiller unit as a fixed value, the UA and 1/(UA) values thereof are thus proportional to the U and 1/U values to justify the connection between the UA and 1/(UA) values provided as fouling indexes in the present invention and the fouling factors from the theory, and further to show the tendency on graph in response to the query for operation date of the HVAC chiller unit or for a period of time during operation.

For example, the entering cooling water temperature of the HVAC chiller unit at 25° C. before being corrected has tolerance between 24.5° C. and 25.4° C. After modified with the rated fouling factor allowance simulation, the tolerance of the entering cooling water temperature at 25° C. becomes from 25.1° C. to 26.0° C. The rest of integer temperatures may be deduced by analogy (see Table 3). The EER value under steady state condition with the rated fouling factor allowance simulation is a standard EER value of the present invention. The standard EER value also called a relative standard EER value or a CNS standard EER value is an EER value under a clean state condition as specified by the rated fouling factor allowance simulation in CNS Standard 12575. An example of the rated fouling factor allowance simulation is provided right in section 6.2.5 of CNS Standard 12575, in which the rated fouling factor allowance simulation is made at 29.4° C. as a non integer temperature with tolerance between 28.9° C.~29.8° C. selected by the positive-negative value method or mid-value clustering method before the simulation, and at 30.0° C. with between 28.9° C.~29.8° C. after the simulation (see Table 3). Another example of the rated fouling factor allowance simulation in the section is made at 29.4° C. with tolerance between 29.4° C.~30.3° C. selected by the integer method or minimum method before the simulation, and at 30.0° C. with tolerance between 30.0° C.~30.9° C. after the simulation (see Table 4).

TABLE 3

Tolerances of temperature before and after the rated fouling factor allowance simulation, wherein the positive-negative value method or mid-value clustering method is adopted before the simulation.

| | Before the rated fouling factor allowance simulation | After the rated fouling factor allowance simulation |
|---|---|---|
| Integer temperature | | |
| 25° C. | 24.5~25.4° C. | 25.1~26.0° C. |
| 26° C. | 25.5~26.4° C. | 26.1~27.0° C. |
| 27° C. | 26.5~27.4° C. | 27.1~28.0° C. |
| 28° C. | 27.5~28.4° C. | 28.1~29.0° C. |
| 29° C. | 28.5~29.4° C. | 29.1~30.0° C. |
| 30° C. | 29.5~30.4° C. | 30.1~31.0° C. |
| Non integer temperature | | |
| 29.4° C. | 28.9~29.8° C. | 29.5~30.4° C. |

TABLE 4

Tolerances of temperature before and after the rated fouling factor allowance simulation, wherein the integer method or minimum method is adopted before the simulation.

| | Before the rated fouling factor allowance simulation | After the rated fouling factor allowance simulation |
|---|---|---|
| Integer temperature | | |
| 25° C. | 25.0~25.9° C. | 25.6~26.5° C. |
| 26° C. | 26.0~26.9° C. | 26.6~27.5° C. |
| 27° C. | 27.0~27.9° C. | 27.6~28.5° C. |
| 28° C. | 28.0~28.9° C. | 28.6~29.5° C. |
| 29° C. | 29.0~29.9° C. | 29.6~30.5° C. |
| 30° C. | 30.0~30.9° C. | 30.6~31.5° C. |
| Non integer simulation | | |
| 29.4° C. | 29.4~30.3° C. | 30.0~30.9° C. |

Therefore, the standard EER value as described above has a different meaning from an absolute standard EER value, as follows.

1. The standard EER value is an EER value measured on surfaces of the heat-exchanger tube of the HVAC chiller unit under a clean state condition as specified by the rated fouling factor allowance simulation in CNS Standard 12575.
2. The absolute standard EER value is an EER value measured on surfaces of the heat-exchanger tube of the HVAC chiller unit where no fouling is found.

The temperature tolerances of the specific integer temperature and tenfold load factor group can be corrected by a factor of 0.6° C. as a rated fouling factor allowance simulation specified in CNS Standard 12575 in 2007, by a factor of 1.2° C. as a rated fouling factor allowance simulation specified in AHRI Standard 550 set up by the Air-Conditioning, Heating and Refrigeration Institute (AHRI) Standard in 1988, or by a factor of 0.6° C. as a rated fouling factor allowance simulation specified in AHRI Standard 550 so far in 1992.

Figure 1:
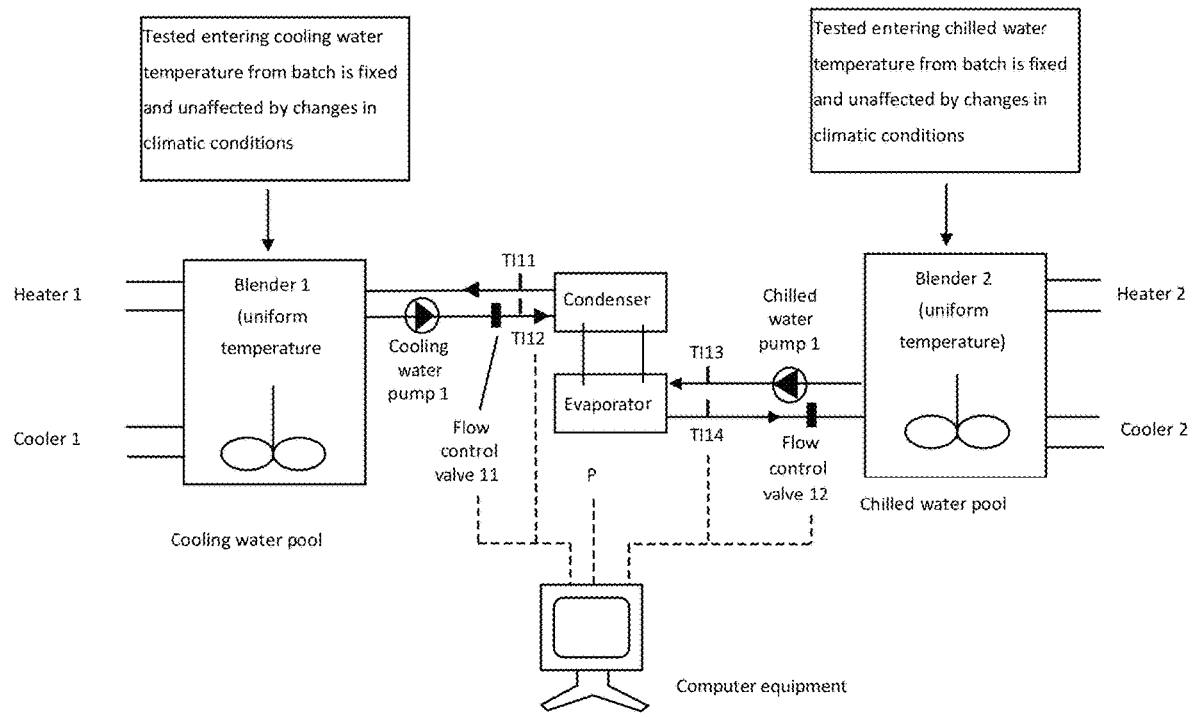
FIG. 1 is a schematic view showing a conventional HVAC chiller unit measured in experimental laboratories and test stations.

Further, in accordance with a preferred embodiment of the present invention, the integrated part-load value (IPLV) of the present invention is distinct because of the applicable place, operation mode, hardware investment, cost on adjustment, and control operation. In conventional way, the IPLV is calculated based on certain temperatures and load factor conditions measured in experimental laboratories and test stations. However, the experimental laboratories and test stations usually need high cost investment to build a water tank for experimental testing use, a boiler or a heat pump for heating up, a chiller unit or a cooling tower for cooling down, water pump for water circulation, besides, a control system, a software system, etc are also needed for the intended use as shown in FIG. 1. In addition, devices such as equipments or systems must be compliance with the CNS Standard and must pass certain regulations made by the Ministry of Economic Affairs via certificate verification procedures.

Figure 2:
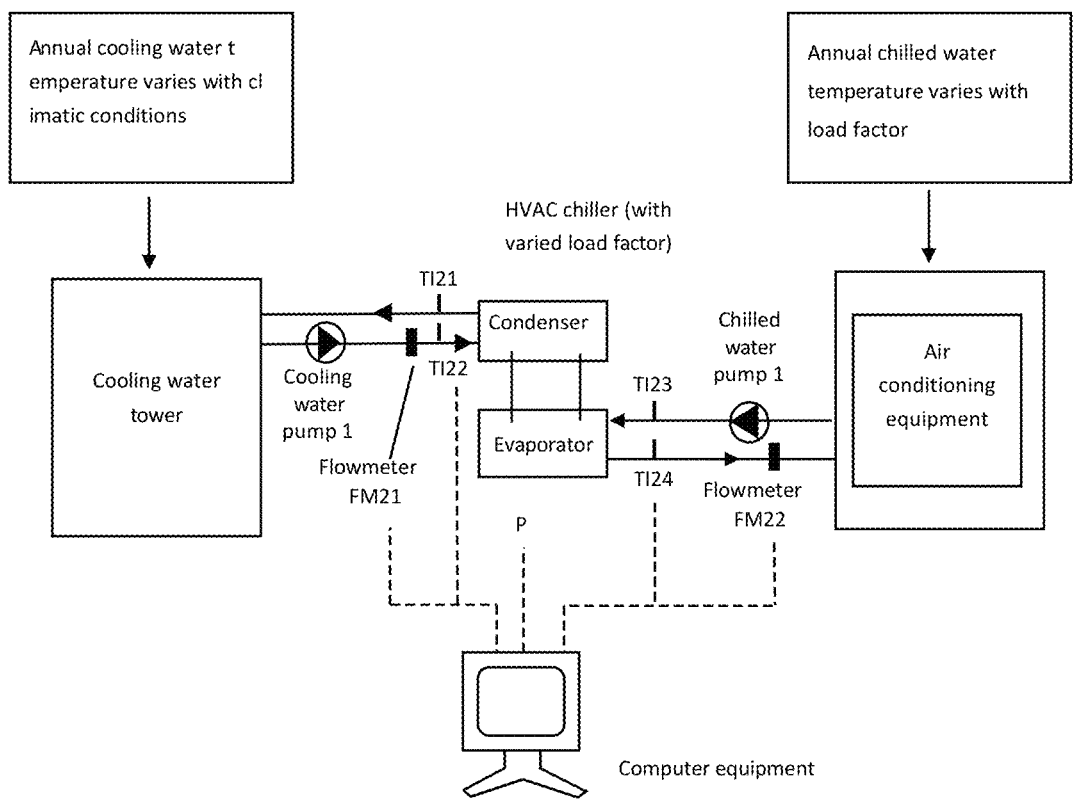
FIG. 2 is a schematic view showing a conventional HVAC chiller unit measured in field.

The integrated part-load value (IPLV) of the present invention does not need to be calculated in certain temperatures and load factor conditions via any hardware investment or operation, and can be directly measured in the field conditions. The field conditions are all dynamic so that some software techniques to deal with the field conditions are also provided in the present invention. In contrast with the conventional software operation in field as shown in FIG. 2, if the field operation conditions are selected as 30° C. in temperature and 100% in load factor as theoretically occur in summer instead of in spring, autumn and winter, the method provided in the present invention is initially establishing a database to include all records of operation data for whole year, instead of initially eliminating unrelated data or seeking for the data close to steady state conditions. The method provided in the present invention also contains distinguishing steady data from non steady data in the database under the field operation conditions of 30° C. in temperature and 100% in load factor, then calculating for the corresponding mean values. Steps for the rest of three IPLV conditions have a same manner that a first step is randomly recording the dynamic operation data and the second step is acquisiting the steady data from the database. Briefly, compared with the software operation of the present invention, the conventional software operation is used in the experimental laboratories and test stations and does not begin to acquisite data until the HVAC chiller unit reaches the steady state (i.e. CNS full loads and the three parts of load conditions), and after the data acquisition, only simple calculations for mean values are performed. Further, when proceeding to acquisite the data from a second load factor condition, the settings need to be changed, and waiting for reaching a new steady state, data acquisition, mean value calculation are also needed again. In this regard, the HVAC chiller unit of the present invention provides with a constant operation capable of constantly acquiring data, without those hardware investments, adjustment and control operations, waiting, costs on adjustment and control operations.

In accordance with the method of verifying and analyzing EER of an HVAC chiller unit of the present invention, the method further provides IPLV with A, B, C, D values for measurement of field running EER, i.e. EER values in the steady state condition of 30° C. 100%, 24° C. 75%, 19° C. 50%, 19° C. 25% according to section 7.5.3.2 in CNS Standard 12575. The calculation of IPLV is as follows.

$$IPLV = WF100\% \times A + WF75\% \times B + WF50\% \times C + WF25\% \times D \quad (3)$$

Figure 3C:
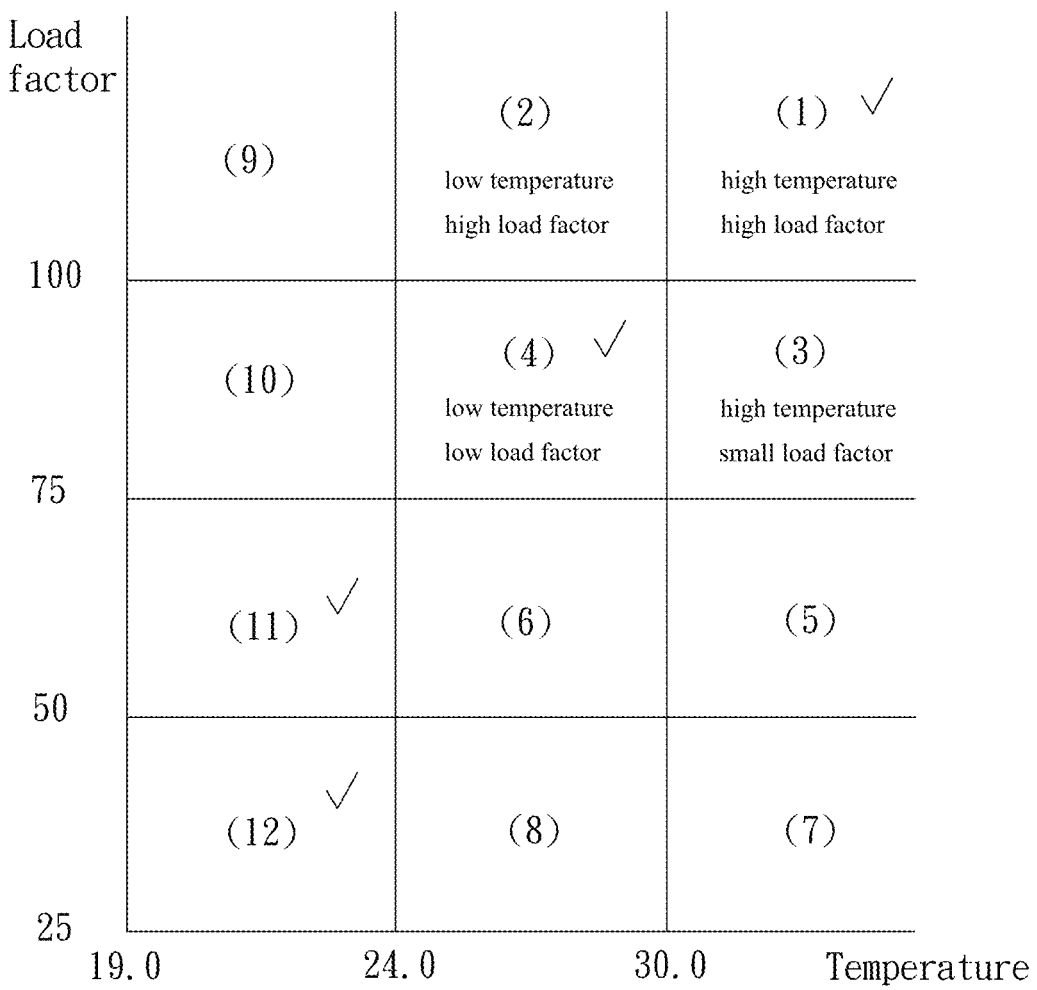
FIG. 3C is a chart illustrating four selected areas of temperatures and load factors of integrated part-load value (IPLV) of an HVAC chiller unit in accordance with the present invention.

In this method, the numbers of the running EER values in each year for four weighted factors WF100%, WF75%, WF50%, WF25% are further obtained. To explain, the weighted factor of WF100% refers to the entering cooling water temperature greater than or equal to 30° C. with the running load factor equal to 100% as shown with line (1) in bold in FIG. 3C. The weighted factor of WF75% refers to the entering cooling water temperature greater than or equal to 24° C. and smaller than 30° C. with the running load factor greater than or equal to 75% and smaller than 100% as shown with section (4) in FIG. 3C. The weighted factor WF50% refers to the entering cooling water temperature greater than or equal to 19° C. and smaller than 24° C. with the running load factor greater than or equal to 50% and smaller than 75% as shown with section (11) in FIG. 3C. The weighted factor of WF25% refers to the entering cooling water temperature greater than or equal to 19° C. and smaller than 24° C. with the running load factor greater than or equal to 25% and smaller than 50% as shown with section (12) in FIG. 3C. And the number of the running EER values in one year is the sum of numbers obtained from all the above ranges or areas. In turn, the percentage of the number of the running EER values from a certain area to the total number of the running EER values of all areas is equal to a weighted factor of the certain area. The obtained four weighted factors and the running EER values thereof are then substituted into the equation (3). The IPLV is determined. In particular, measuring single water temperature and load factor condition for each batch to calculate four weighted factors is unprecedented in Taiwan patent applications due to the lack of local market demand, let alone further calculating the IPLV based on the measurement. In contrast, the software of the present invention is initially to screen for the four running EER values under steady state and the four weighted factors are obtained for the calculation of IPLV via equation (3).

The method further includes filtering the running EER values under steady state in the specific integer temperature and tenfold load factor group (Table 5 and 6). As described above, the IPLV is obtained as the four weighted factors for whole year and the running EER values thereof are known. In other word, the IPLV represents the running EER for whole year, weighted factors (i.e. percentage of the operation hours) in four temperature and load factor conditions, and the running EER value in analysis of efficiency, so as to know the distribution of energy consumption rate in operation and efficiency of the HVAC chiller unit for whole year.

Figure 3D:
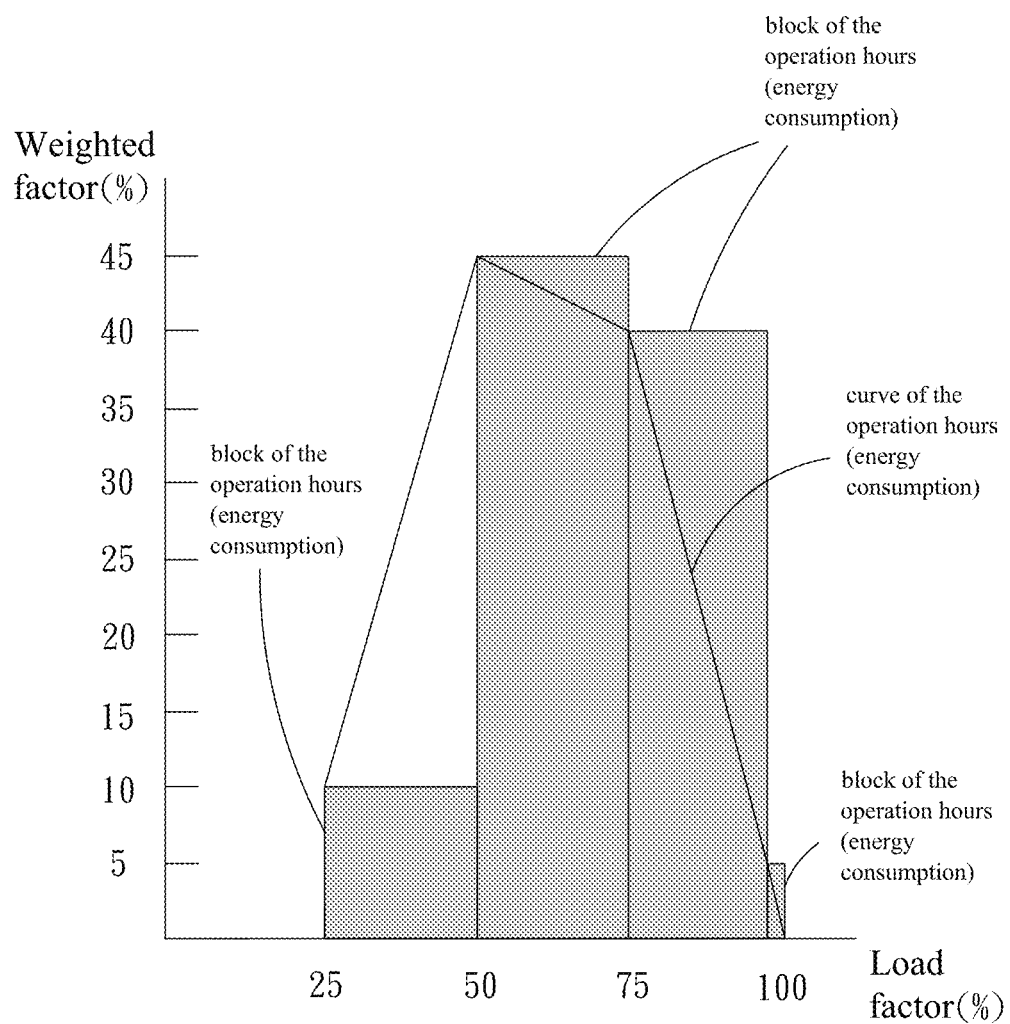
FIG. 3D is a bar chart illustrating the distribution of energy consumption rate in operation based on annual running EER values and weighted factors (i.e. percentages of the operation hours).

Referring to FIG. 3D, which shows an example illustrating the distribution of energy consumption rate in operation. As shown, annual operation hours of the HVAC chiller unit are 365*24=8760 hours. The four weighted factors are 5%, 40%, 45%, 10%, which are WF100%, WF75%, WF50%, WF25%, and the operation hours thereof are 438, 3504, 3942, 876 hours. Then a kW value can be obtained from EER multiplied by the running load factor. Since the kW value is known, the kWh values, i.e. kWh under the four temperature and load factor conditions and kWh for whole year can also be obtained. In other word, the IPLV does not be calculated based on all possible temperature and load factor conditions but on four temperature and load factor areas as representation made in terms of the thirty-six sets of common operation conditions of the climate of Taiwan complying with national and international standards. It may be beneficial for owners to regard the IPLV as a baseline for their annual evaluations. The Ministry of Economic Affairs as a public organization can thus access to the advanced and correct distribution of energy consumption and efficiency of national HVAC chiller units for whole year as a basis of setting energy saving policy.

TABLE 5

Combinations of temperature and load factor for IPLV by positive-negative value method or mid-value clustering method.

| Weighted factor and operation value | Entering cooling water temperature | Tolerance of the entering cooling water temperature | Load factor | Tolerance of the Load factor | leaving chilled water temperature | Tolerance of the leaving chilled water temperature |
|---|---|---|---|---|---|---|
| WF25%、D | 19° C. | 18.5~19.4° C. | 25 | 20~29.9% | 7° C. | 6.5~7.4° C. |
| WF50%、C | 19° C. | 18.5~19.4° C. | 50 | 45~54.9% | | |
| WF75%、B | 24° C. | 24.5~25.4° C. | 75 | 70~79.9% | | |
| WF100%、A | 30° C. | 29.5~30.4° C. | 100 | 95~100% | | |

TABLE 6

Combinations of temperature and load factor for IPLV by the integer method or minimum method.

| Weighted factor and operation value | Entering cooling water temperature | Tolerance of the entering cooling water temperature | Load factor | Tolerance of the Load factor | leaving chilled water temperature | Tolerance of the leaving chilled water temperature |
|---|---|---|---|---|---|---|
| WF25%、D | 19° C. | 19.0~19.9° C. | 25 | 25~34.9° C. | 7° C. | 7.0~7.9° C. |
| WF50%、C | 19° C. | 19.0~19.9° C. | 50 | 50~59.9% | | |
| WF75%、B | 24° C. | 27.0~27.9° C. | 75 | 75~84.9% | | |
| WF100%、A | 30° C. | 30.0~30.9° C. | 100 | 100% | | |

Figure 3E:
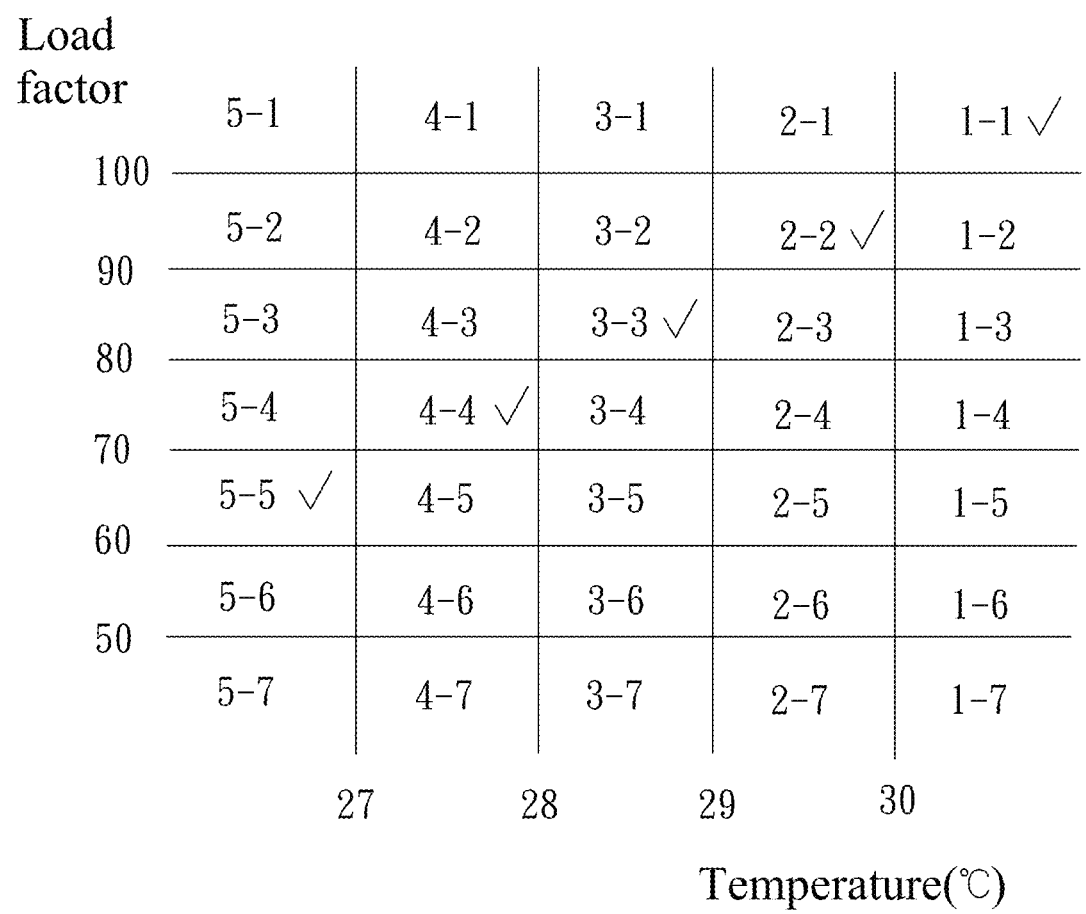
FIG. 3E is a chart illustrating five selected areas of temperatures and load factors of APLV/NPLV of an HVAC chiller unit in accordance with the present invention.

Referring to FIG. 3E as a preferred embodiment of the present invention illustrating ranges or areas of temperatures and load factors of APLV/NPLV of an HVAC chiller unit in accordance with the present invention, the calculation of APLV/NPLV is similar with that of IPLV, as follows.

$$APLV(NPLV) = WF100\% \times A + WF90\% \times B + WF80\% \times C + WF70\% \times D + WF60\% \times E + WF50\% \times F \qquad (5)$$

where A is COP or EER for 100% refrigeration capacity; B is COP or EER for 90% refrigeration capacity; C is COP or EER for 80% refrigeration capacity; D is COP or EER for 70% refrigeration capacity; E is COP or EER for 60% refrigeration capacity; F is COP or EER for 50% refrigeration capacity. In this method, the numbers of the running EER values for whole year corresponding to the four weighted factors WF100%, WF90%, WF80%, WF70%, WF60%, WF50% are further obtained. To explain, the weighted factor of WF100% refers to the entering cooling water temperature greater than or equal to 30° C. with the running load factor equal to 100% as shown with line (1-1) in bold in FIG. 3E. The weighted factor of WF90% refers to the entering cooling water temperature greater than or equal to 29° C. and smaller than 30° C. with the running load factor greater than or equal to 90% and smaller than 100% as shown with section (2-2) in FIG. 3E. The weighted factor of WF80% refers to the entering cooling water temperature greater than or equal to 28° C. and smaller than 29° C. with the running load factor greater than or equal to 80% and smaller than 90% as shown with section (3-3) in FIG. 3E. The weighted factor of WF70% refers to the entering cooling water temperature greater than or equal to 27° C. and smaller than 28° C. with the running load factor greater than or equal to 70% and smaller than 80% as shown with section (4-4) in FIG. 3E. The weighted factor of WF60% refers to the entering cooling water temperature greater than or equal to 26° C. and smaller than 27° C. with the running load factor greater than or equal to 60% and smaller than 70% as shown with section (5-5) in FIG. 3E. The weighted factor of WF50% refers to the entering cooling water temperature greater than or equal to 25° C. and smaller than 26° C. with the running load factor greater than or equal to 50% and smaller than 60% (not shown). And the number of the running EER values for whole year is the sum of numbers obtained from all the above tolerances. In turn, the percentage of the number of the running EER values from a certain area to the total number of the running EER values in all the areas is equal to a weighted factor of the certain area. The obtained six weighted factors and the running EER values thereof are then substituted into the equation (5). The APLV(NPLV) is determined. In other word, the APLV (NPLV) does not be calculated based on all possible temperature and load factor conditions but on six sets of temperature and load factor areas as representation made in terms of the thirty-six sets of common operation conditions of the climate of Taiwan complying with national and international standards. It may be beneficial for owners to regard the APLV(NPLV) as a baseline in their annual evaluations. In particular, measuring single water temperature and load factor condition for each batch to calculate six weighted factors is unprecedented in Taiwan patent applications due to the lack of local market demand, let alone further calculating the APLV(NPLV). In contrast, the software of the present invention is initially to screen for the six running EER values under steady state and the six weighted factors are obtained for the calculation of APLV(NPLV) via equation (5).

Next, step S20 is executed followed by step S10. Step S20 includes taking certain percentage ranges from the specific integer temperature(s) and tenfold load factor(s) group as a selection basis to calculate standard EER values and running EER values, and storing the standard EER values and running EER values. The running EER values are measured in situ (field) under fouling state. That is, the specific integer temperature(s) and tenfold load factor(s) group is hereby a basis, on which the energy efficiency ratio (EER) of the HVAC chiller unit can be calculated one group after another. The energy efficiency ratios (EERs) of the HVAC chiller unit calculated on a basis in one first group of the specific integer temperature and tenfold load factor group is further calculated with the specification of the certain percentage ranges, to obtain the standard EER values and the running EER values. The specification of the certain percentage ranges contains calculations by a mean-value steady-state screening method and a thermal balance steady-state screening method. In practice, the mean-value steady-state screening method, or the thermal balance steady-state screening method is utilized to work out the EER values in the certain percentage ranges of 5%, 4%, 3%, 2%, and 1%, or specifically in the certain percentage ranges comprising non-integer percentages, such as 4.1~4.9% in the certain percentage range of 5%.

Figure 4:
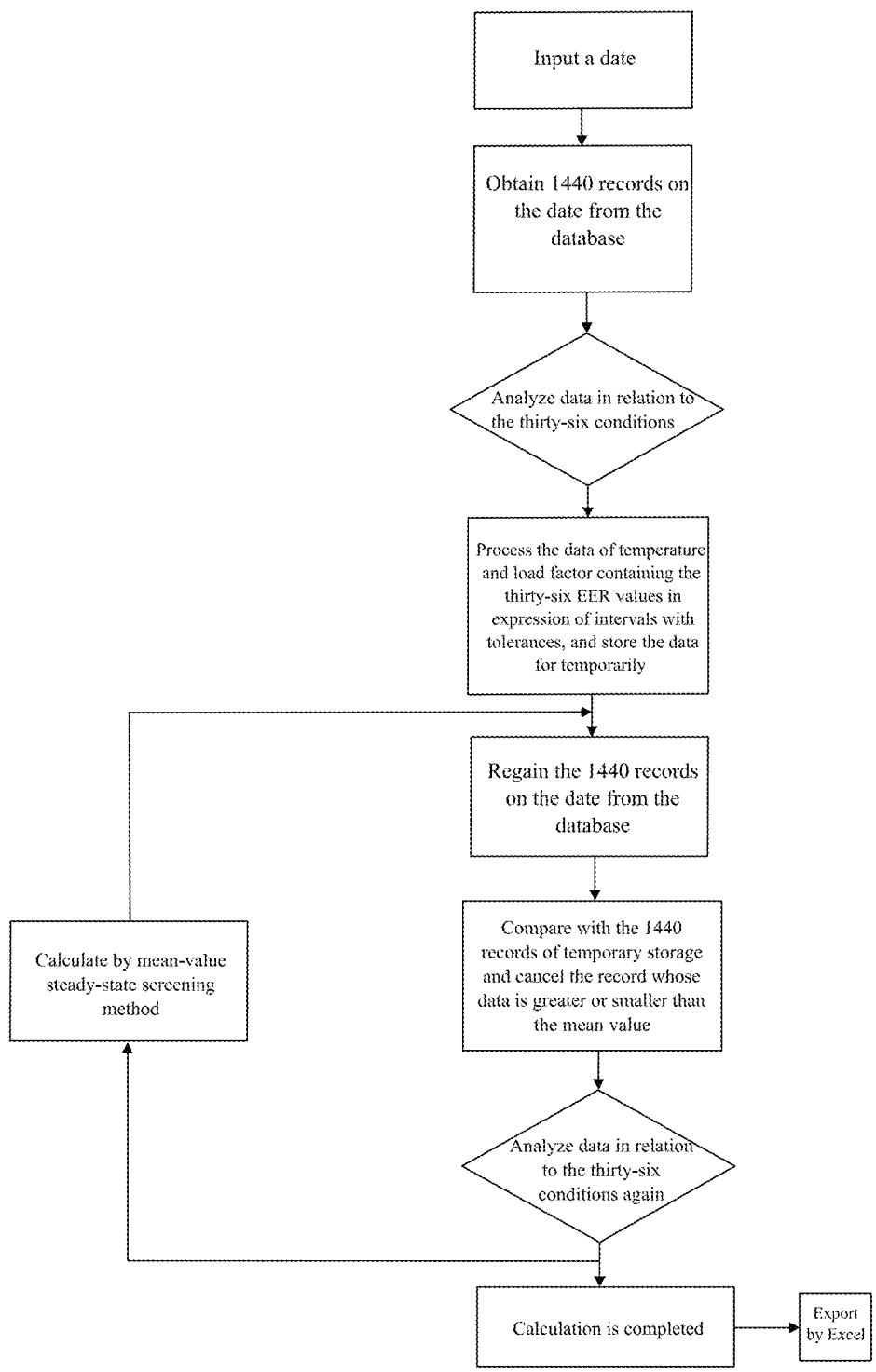
FIG. 4 is a flowchart illustrating a standard EER value query in accordance with the present invention, in which a mean-value steady-state screening method is used.

Referring to FIG. 4 as a flowchart illustrating a standard EER value query in accordance with the present invention, the mean-value steady-state screening method is used to calculate the standard EER values and the running EER values. The method contains initially calculating first mean EER values according to temperature and load factor conditions, then after removing EER values outside an absolute value difference of 25%, taking EER values within an absolute value difference of 25% as second mean EER values, and further narrowing the absolute value difference to 10% and 5% as being third and fourth EER values, wherein the fourth mean EER values are taken as a basis of the standard EER values and the running EER values. The method further contains setting the operation data of the standard EER values and the running EER values as steady state data, while setting the operation data of the removed values in previous three times as non-steady state data, and then respectively storing the steady state data and non-steady state data, and exporting the stored data in Excel form when requested. As described above, the standard EER value refers to the value created on the installation completion date of new construction project or acid-cleaning date both of which are under no-fouling state, and the running EER value refers to the field measured value under fouling state. Their measuring time points are different. The dynamic EER values have corresponding COP values and kW/RT values that participate in calculations for multifunctional queries.

It is worthy of note that the newly installed HVAC chiller unit using energy saving standard of water treatment turns out to comply with energy conservation criteria with its running EER values evaluated by the method of the present invention. If the water treatment is poor, when the HVAC chiller unit keeps operating for a period of time, the fouling would be accumulated on the heat-exchanger tube soon, which dose not achieve the energy conservation criteria (FIGS. 9A~10C, described later). The method in accordance with the present invention by measuring its running EER values shows the same result. In addition, the function of verifying the extent of the improvements on the fouling state may be beneficial in acceptance of society as well as in reducing resistance against governmental energy-saving policys.

Figure 5:
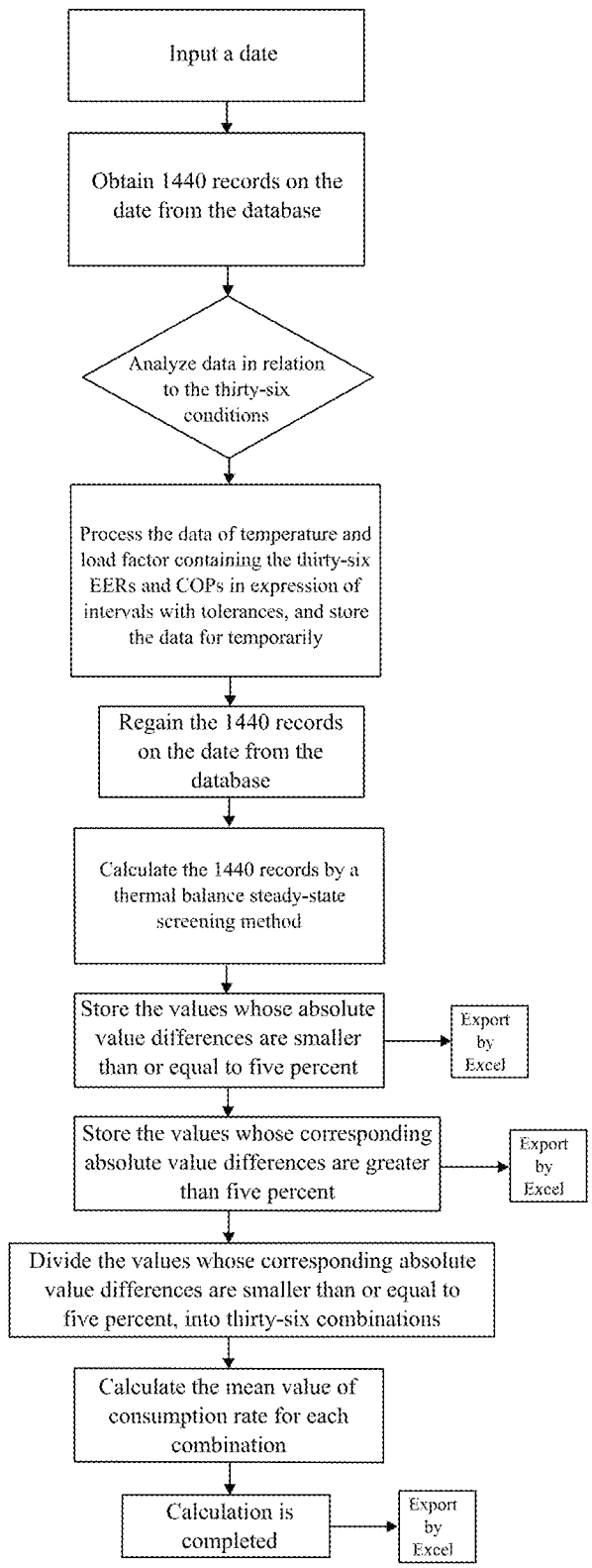
FIG. 5 is a flowchart illustrating a running EER value query in accordance with the present invention, in which a thermal balance steady-state screening method is used.

In accordance with a preferred embodiment of the present invention, compared with the previous embodiment, this embodiment differs in that the selected standard EER values and running EER values are calculated in the thermal balance steady-state screening method. Referring to FIG. 5 as a flowchart illustrating a running EER value query in accordance with the present invention, in which the thermal balance steady-state screening method is used, the method contains initially removing values outside an absolute value difference of 5% of the dynamic EER values, with the removed values outside the absolute value difference of 5% listed as non-steady state data and the values within 5% listed as steady state data (see equation (6) as below), exporting the steady state and non-steady data in Excel form, distributing the steady state data into same numbers of temperature and load groups and averaging the distributed data in each temperature and load group to obtain mean values to determine the standard EER values and the running EER values.

$$(q_{ev}+W_{input}-q_c)/q_c*100\% \quad (6)$$

where $q_{ev}$ is refrigerating capacity; $W_{input}$ is energy of input work of compressor; $q_c$ is heat transferred from condenser to cooling water.

Figure 7:
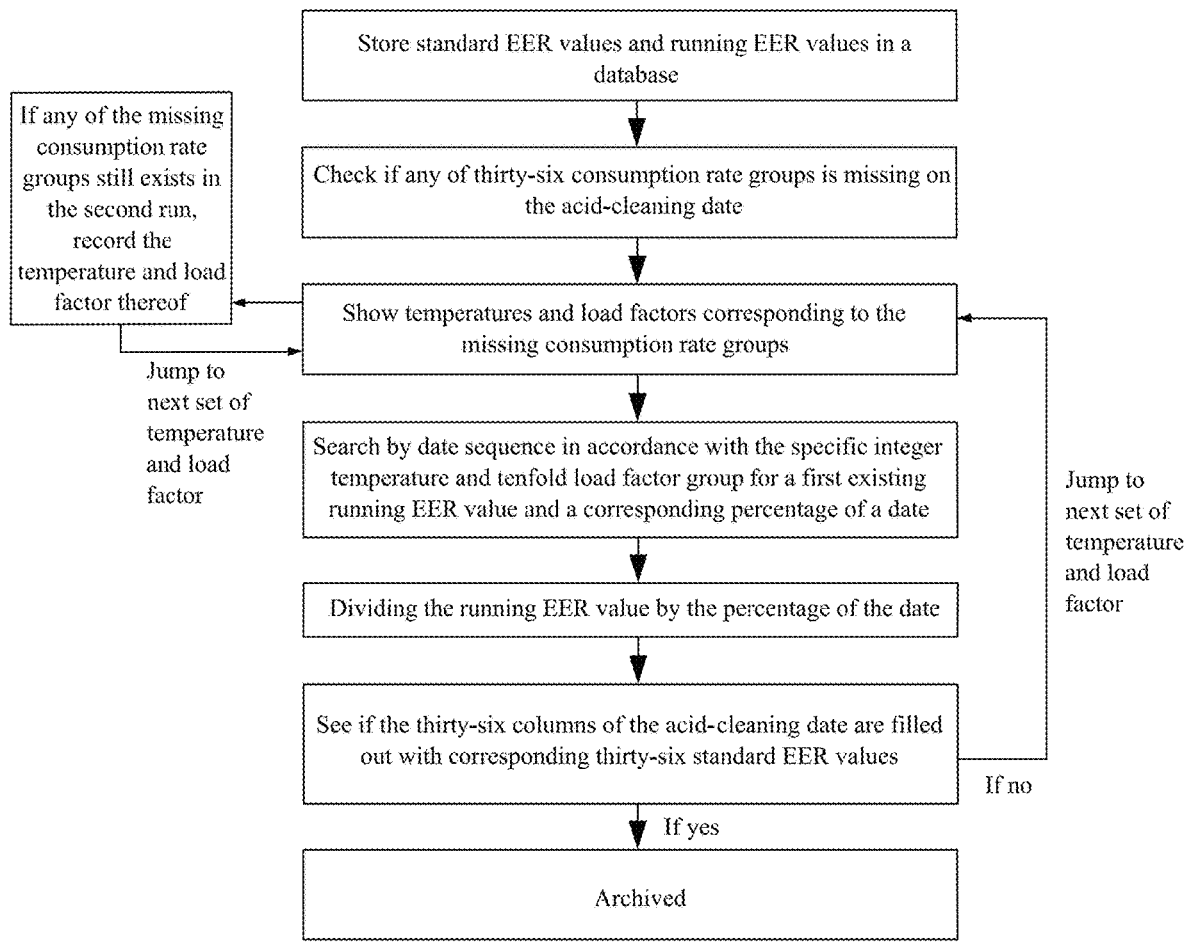
FIG. 7 is a flowchart illustrating a method of filling up missing values in accordance with the present invention.
Figure 8A:
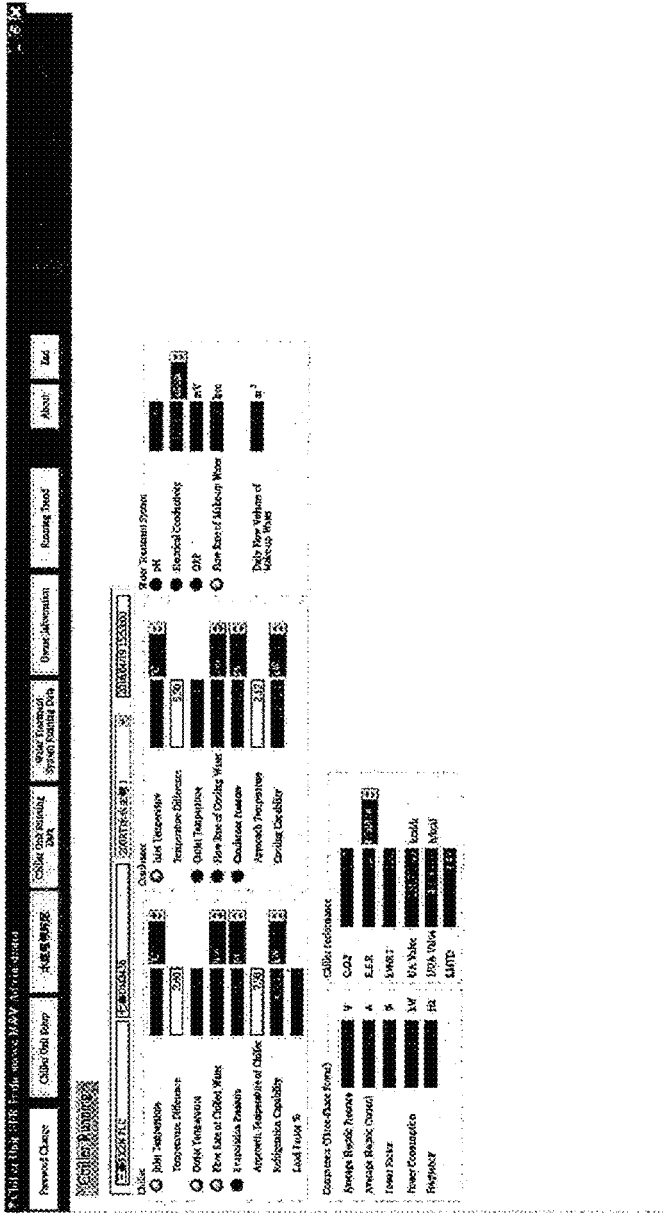
Figure 8B:
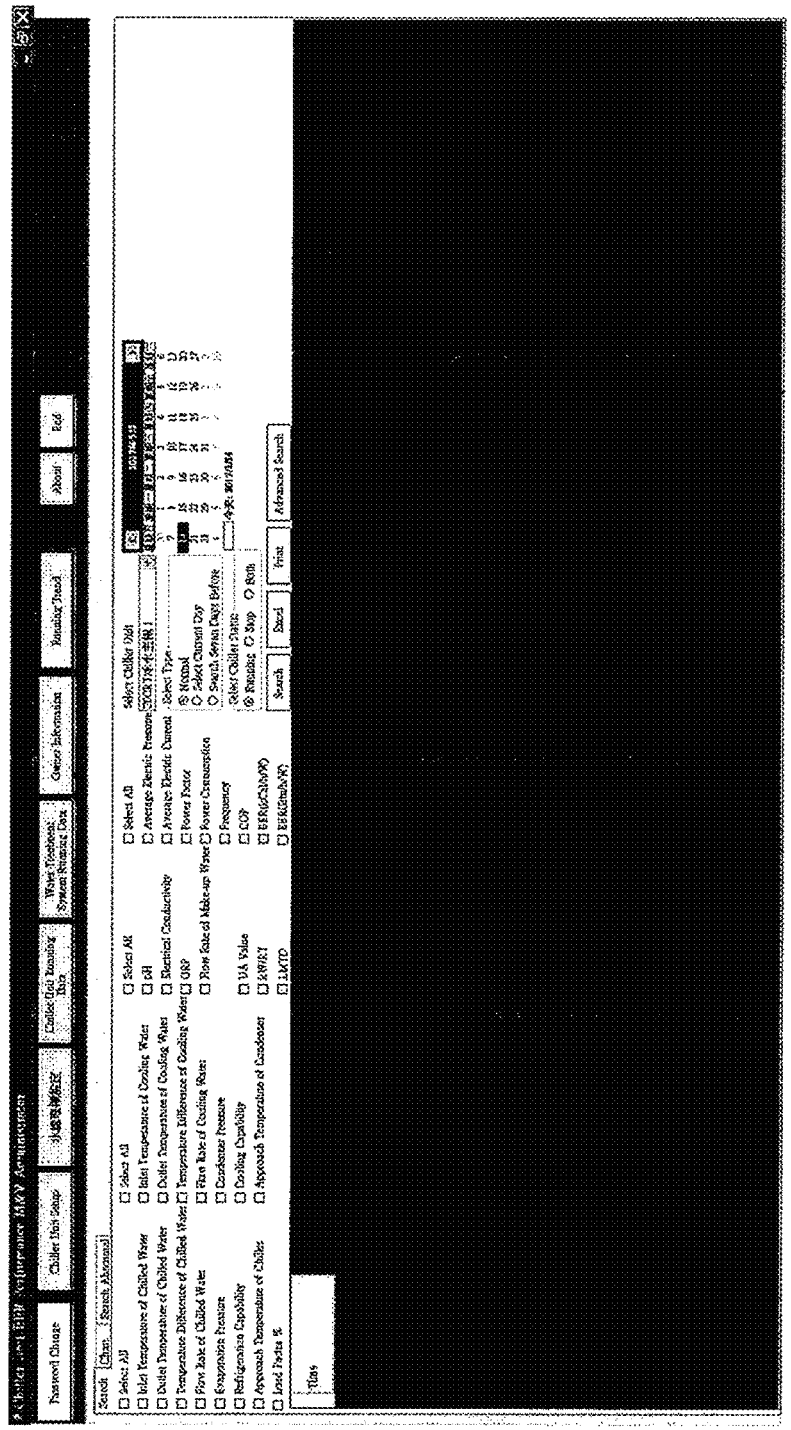
Figure 8F:
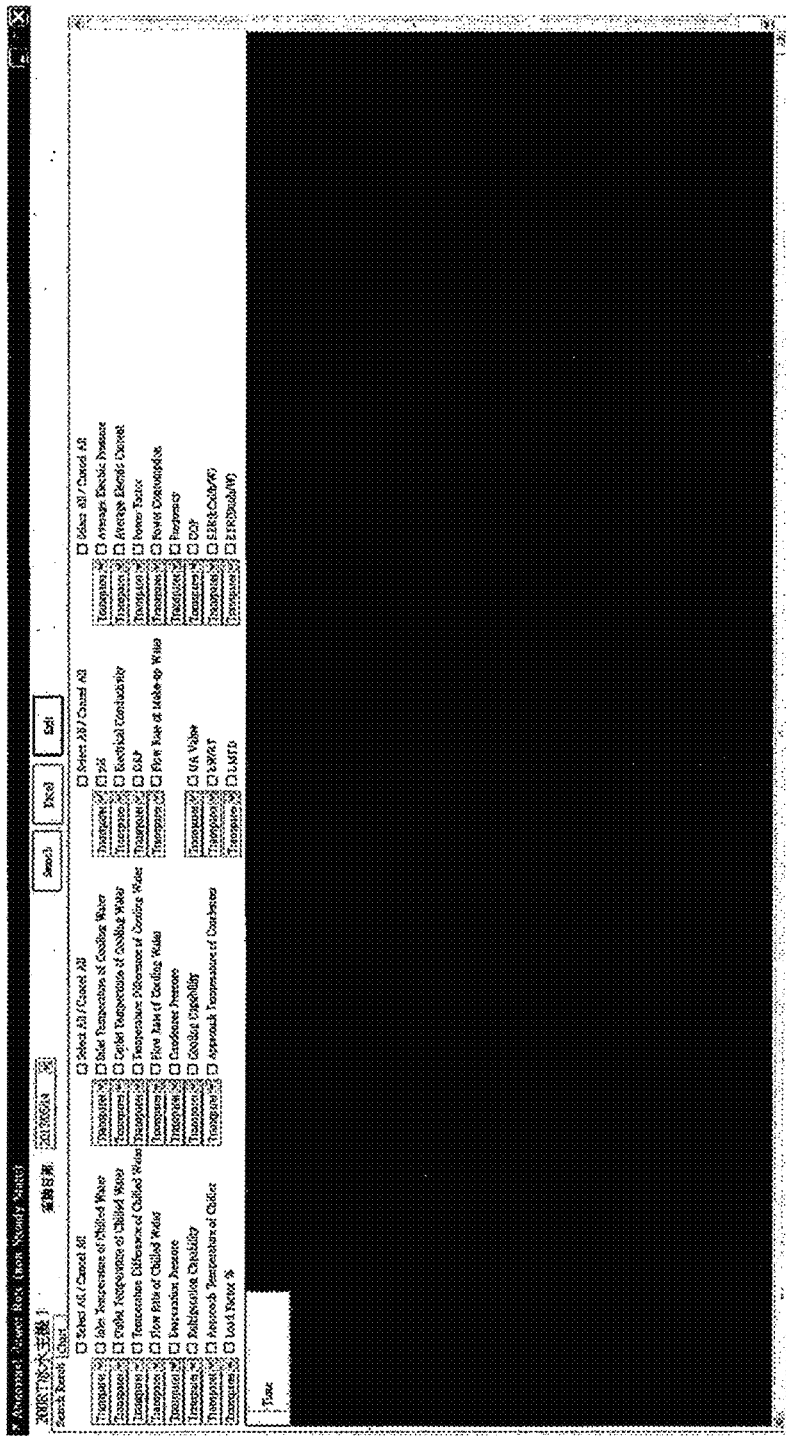
Figure 8G:
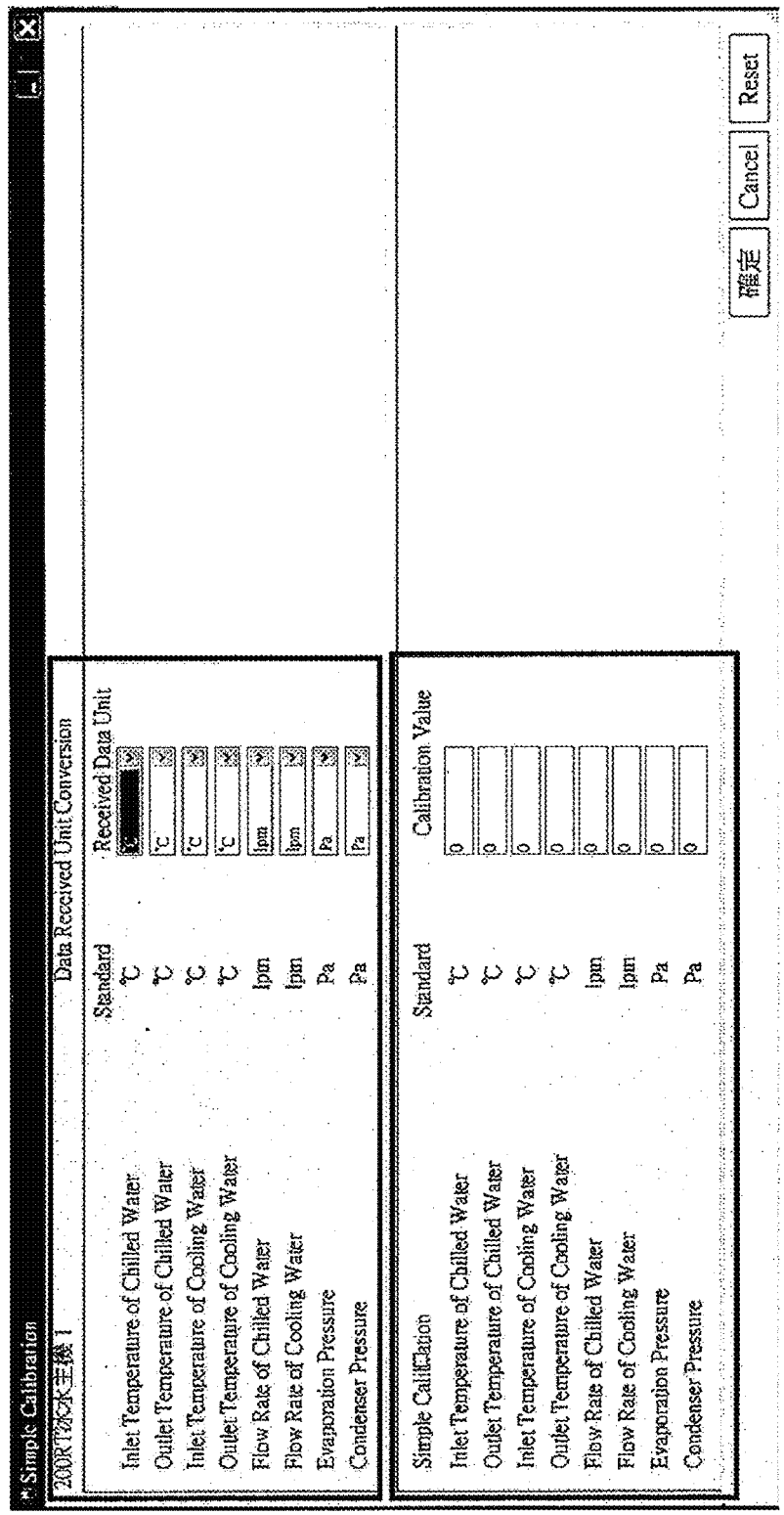
Figure 8H:
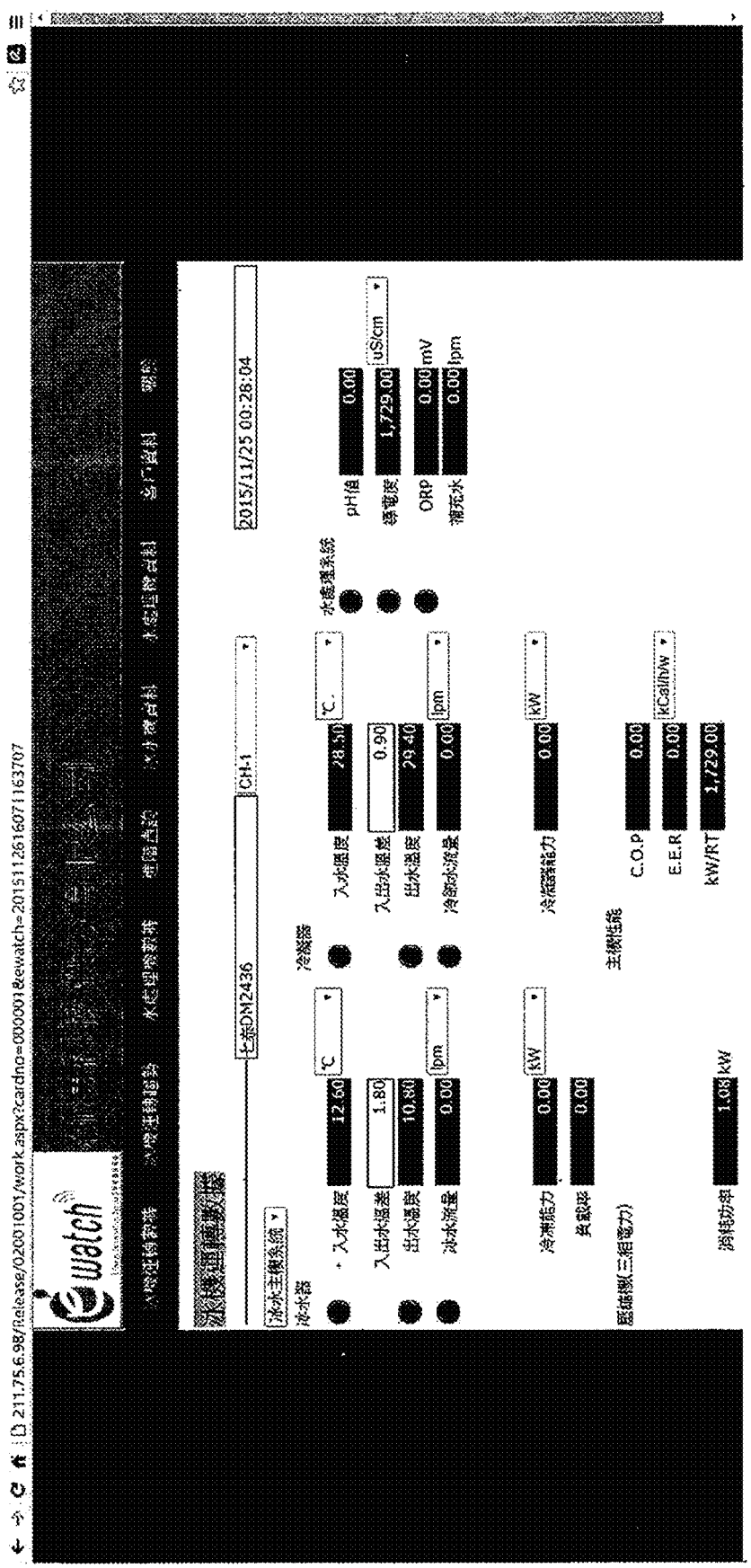
Figure 8I:
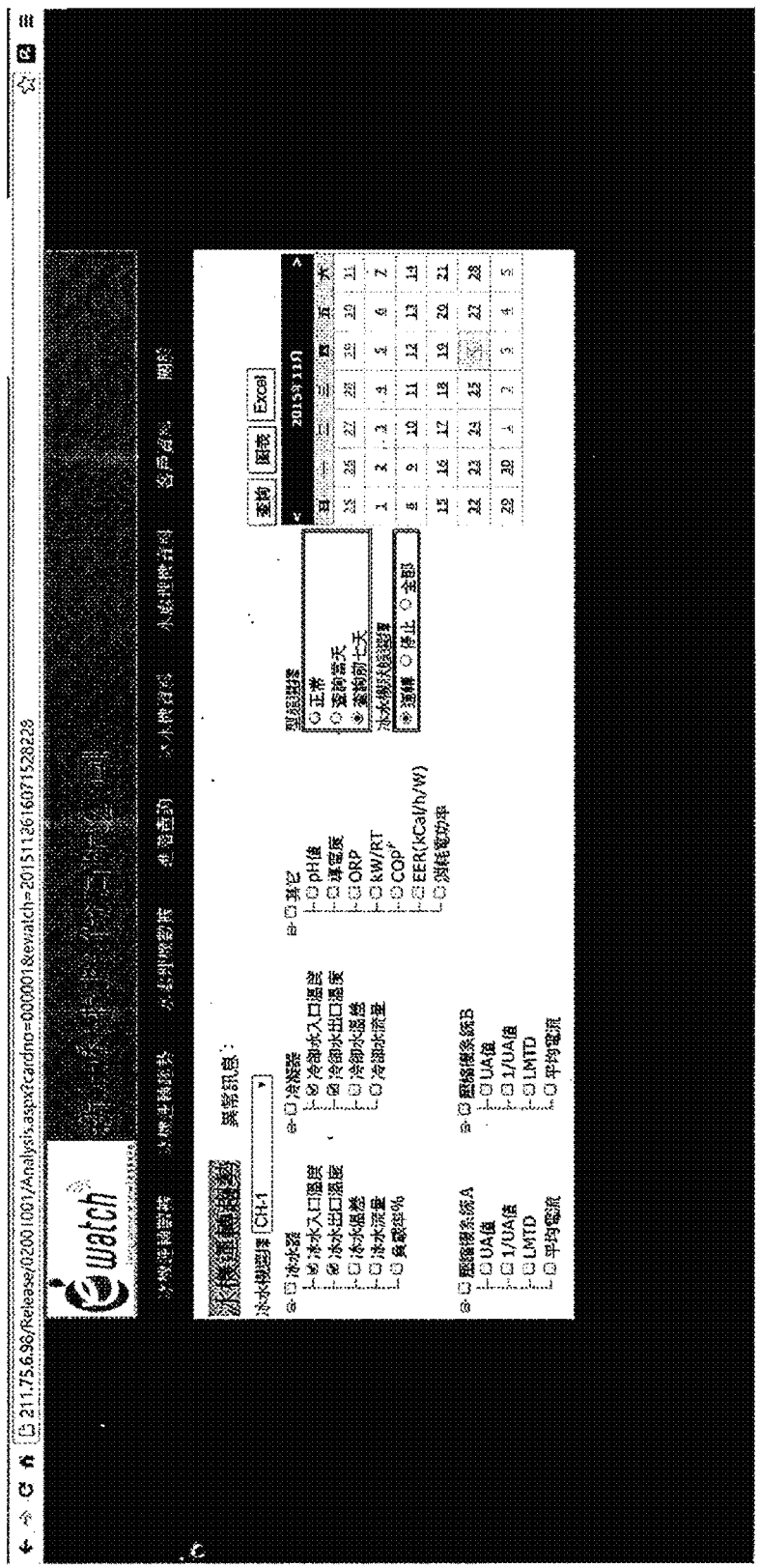

In fact, standard EER values in field measurements in any season of a year, or selected thirty-six combinations of the specific integer temperature and tenfold load factor group can not be acquisited entirely in one time in a single day. For example, low temperatures and low running load factors may be absent during summer, high temperatures and high running load factors may be absent during winter, and high or low temperatures and high or low running load factors may be absent during spring and autumn. Therefore, the present invention thus provides an algorithm in relation to the transitive law as a technique of filling up the missing value in order to find out missing standard EER values for the comparison with field measured running EER values afterwards. In details, the technique of filling up the missing value is finding the integer temperature and tenfold load factor of a missing value in the standard EER values then searching by date sequence in accordance with the specific integer temperature and tenfold load factor group for a first existing running EER value and its corresponding percentage of the date, i.e. an average percentage of the corresponding running EER value against the existing standard EER value of the day, and dividing the running EER value by the percentage of the date to find out an alternative standard EER value in the same condition of temperature and load factor, so that the standard EER value combinations of the specific integer temperature and tenfold load factor group are provided when needed. It may be beneficial for measurement, verification and analysis on all the four seasons (shown in FIG. 7).

An example of the technique of filling up the missing value is checking standard EER values measured on acid-cleaning dates and find a missing standard EER value, then search by date sequence in a same condition of integer temperature and tenfold load factor for an first existing running EER value and its day average percentage corresponding to the missing standard EER value, then divide the running EER value by the percentage to obtain an alternative standard EER value, and fill the alternative standard EER value in the database to replace the missing standard EER value. For example, if 28° C. and 80% are known as the highest entering cooling temperature and load factor on the acid-cleaning date of May 15$^{th}$, then the group of 29° C., 80% must lack a standard EER value. To get the missing standard EER value, firstly search by date sequence and find out a running EER value of 4.85 and a percentage of 95% on a closest date of June, 5$^{th}$ that has same condition of 29° C., 80%, then divide the running EER value of 4.85 by the percentage of 95% to obtain an alternative standard EER value of 5.10. The alternative standard EER value is then filled in the group of 29° C., 80% in the database. Other missing standard EER values on the acid-cleaning date are also found in the same way until the missing standard EER values are all filled up.

The field acid-cleaning date usually comes during spring, or before the summer, depending on user's need. No matter what season the acid-cleaning date is selected, the thirty-six combinations of the specific integer temperature and tenfold load factor group cannot be filled entirely without the technique of filling up the missing value, i.e. low temperatures and low running load factors may be absent during summer, high temperatures and high running load factors may be absent during winter, and high or low temperatures and high or low running load factors may be absent during spring and autumn.

Although it is shown above that the missing standard EER value can be found by the technique of filling up the missing value, it is reasonable that the cold air mass and other climatic factors may affect the temperature and load factor. When the cold air mass arrives, the temperature and load factor may drop lower than that listed in the thirty-six combinations of the specific integer temperature and tenfold load factor group to form unexpected values. The unexpected values refer to the integer temperatures of the entering cooling water smaller than 24.4° C. and greater than 30.5° C. and the tenfold load factors of the entering cooling water smaller than 45.4% (Table 1 and Table 2). By 30-year experience of field interviews, researches, and data collections, the inventor realizes that there is no need to turn on the HVAC chiller units for use during the period of cold air mass, so most of the HVAC chiller units are not operating during this time, and that the entering cooling water temperature greater than 30.5° C. is rarely seen because the capacity of the cooling tower has 25%~30% more than the capacity of the HVAC chiller unit, and even to 50% in some special cases. In general, the unexpected values are not generated very often. The extrapolation method may be used to calculate the unexpected value, but it comes out with a high tolerance rate which is not acceptable in practice. The present invention hereby provides the percentages of thirty-six running EER values of a day to represent the percentage of the unexpected values of the day without any tolerance rates, which is more likely to be accepted in practice.

Briefly, the ratio of COP or EER in any temperature and load factor condition of a day for both the common temperature and load factor and the unexpected value against a standard value of the day is merely relative to the fouling index of the condenser of the HVAC chiller unit. A working equation is as follows. The technique of filling up the missing value as previously introduced is hereby applied.

$$1/(UA)=\Delta TLM/(m*Cp*\Delta T)=\Delta T_{LM}/Q \quad (4)$$

$$COP=Q_{EV}/kW \quad (2\text{-}2)$$

$$EER=COP*0.86(\text{in kcal/W-h}) \quad (2\text{-}3)$$

$$fi=1/(UA)_f-1/(UA)c \quad (2)$$

Alternatively, the equation (2-2) COP=$Q_{EV}$/kW may be replaced by $Q_{EV}=Q_{COND}-W_{input}$, because the freezer temperature is relative to the operation of the evaporator in each freezer, and also the refrigerant flows back to compressor inlet, the refrigerating capacity is equivalent to cooling capacity. The load factors are calculated in the same way as chilled water and brine water machine. The chilled water and brine water temperature is replaced with the temperature of the refrigerants at the compressor inlet.

Figure 6:
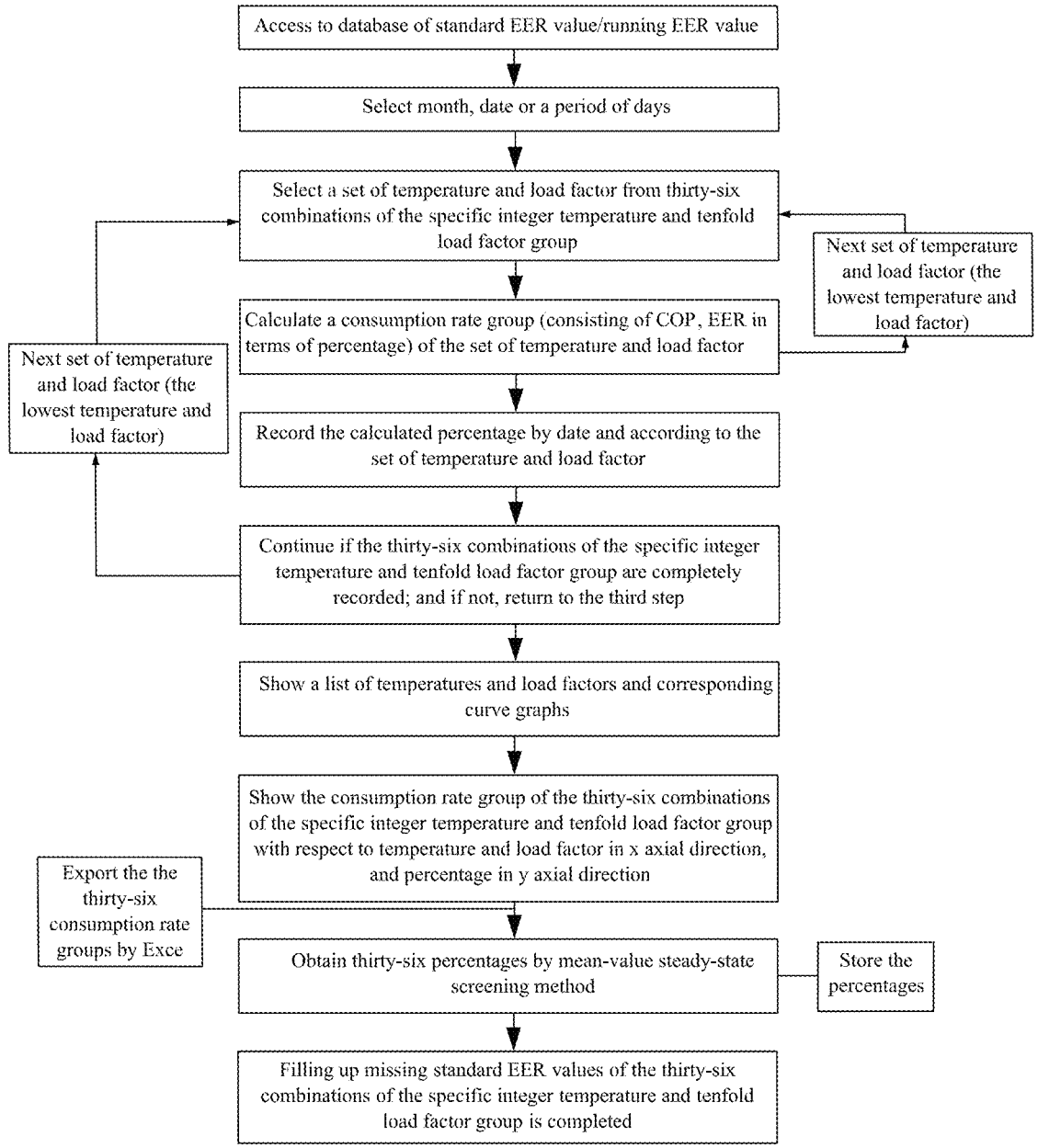
FIG. 6 is a flowchart illustrating a comparative analysis of EER value group (consumption rate group) in accordance with the present invention.

Finally, step S30 is executed followed by step S20, including dividing one of the obtained running EER values by a corresponding standard value in terms of percentage in a same condition of cooling water integer temperature, tenfold load factor and chilled water or brine water (or refrigerant) integer temperature to provide a comparative analysis of the running EER values to show a correct changing trend of the EER values in order to determine whether an energy consumption meets specified criteria. Comparative analysis by using standard/running EER values is the same meaning of providing the changing trend of the running EER values. The method shown in FIG. 6 includes selecting the standard/running EER values as a basis, selecting the ratio of the running EER values to the standard EER values in terms of percentage in a duration time such as but not limits thirty, sixty or ninety days. The function is to query the ratio of the running EER values in a duration time to the selected standard values. With the same water temperature and load factor, the running EER values are divided by the standard EER values in terms of percentage. If no EER values are found in a selected water temperature and load factor group, then skip to next water temperature and load factor group. For example, the ratio of temperature 28° C. to the load factor 80% in terms of percentage is taken as the percentage of the temperature and load factor of a single day. In the embodiment, the full-day percentage is available to be selected. The mean value of the percentage of thirty-six combinations of the specific integer temperature and tenfold load factor group is listed as the percentage of the day. It is beneficial to draw a curve plotted according to the percentage list of each day during a period of time such as thirty, sixty or ninety days that is counted from the completion date or acid-cleaning date in order to obtain the correct daily running EER value, and to compare and analyze for the distribution of energy consumption in the same condition of the temperature and load factor in order to determine the smallest running EER value for each week, each month, each season, each half of year or each year. Steps from S10 to S30 are methods that provide comparative analysis on field measuring data containing steady-state standard EER values and fouling-state running EER values. The present invention thus provides comparative analysis for distribution of energy consumption in the same condition of the temperature and load factor through the measurement of daily running EER value to determine the smallest running EER value for each week, each month, each season, each half of year or each year as a management index value. The changing curve plotted with the obtained running EER values is a basis of product acceptance and warranty.

As described above, the changing curve plotted with the obtained running EER values from steps S10 to S30 is able to determine whether the variation of the running EER value during product acceptance and warranty complies with the engineering energy-saving project contract for the HVAC chiller unit. The curve of the running EER (hereinafter called the WWHH conversion meter that will be discussed in more detail later), including a curve section of agreement values before energy-saving performance improved, a curve section of the running EER value after energy-saving performance improved. The calculation for each curve section is as follows.

$\%_{improved\ amplitude\ of\ each\ temperature\ and\ load\ factor} = (EER_{after\ improvement} - EER_{WWHH}) \div EER_{after\ improvement} * 100\%$ $\%_{daily\ improvement} = [\Sigma_{36\ values} (\%_{improved\ amplitude\ of\ each\ temperature\ and\ load\ factor})]_{average}$ Total improved electrical power=$\Sigma_{current\ period} (kWh_{after\ improvement} * \%_{daily\ improvement})_{selected\ day}$ where $EER_{after\ improvement}$ is a daily running EER value after energy-saving performance improved; $EER_{WWHH}$ is an converted agreement value corresponding to same temperature and load factor as improved running EER value for which the energy-saving performance has not been improved; $\%_{improved\ amplitude\ of\ each\ temperature\ and\ load\ factor}$ is percentage illustrating an improvement of each temperature and load factor; $\%_{daily\ improvement}$ is percentage illustrating an average of daily improvement; $kWh_{after\ improvement}$ is total electricity consumption on a selected day after energy-saving performance improved.

To calculate the $\%_{improved\ amplitude\ of\ each\ temperature\ and\ load\ factor}$, each of the running EER values ($EER_{after\ improvement}$) obtained in the same condition of water temperature and load factor in step S30 is used to subtract the corresponding EER value in project contract ($EER_{WWHH}$ without energy-saving improvement) and then to be divided by the running value ($EER_{after\ improvement}$) in terms of percentage. The $\%_{daily\ fouling\ index}$ is an average of the energy-saving improvement amplitude (%) of each temperature and load factor. In other word, the energy-saving improvement amplitude (%) of each temperature and load factor is averaged form a total value of thirty-six combinations of the specific integer temperature and tenfold load factor group of step S10. To calculate the total electricity consumption, the function of daily fouling index is multiplied by total electricity consumption on the selected day.

Figure 9A:
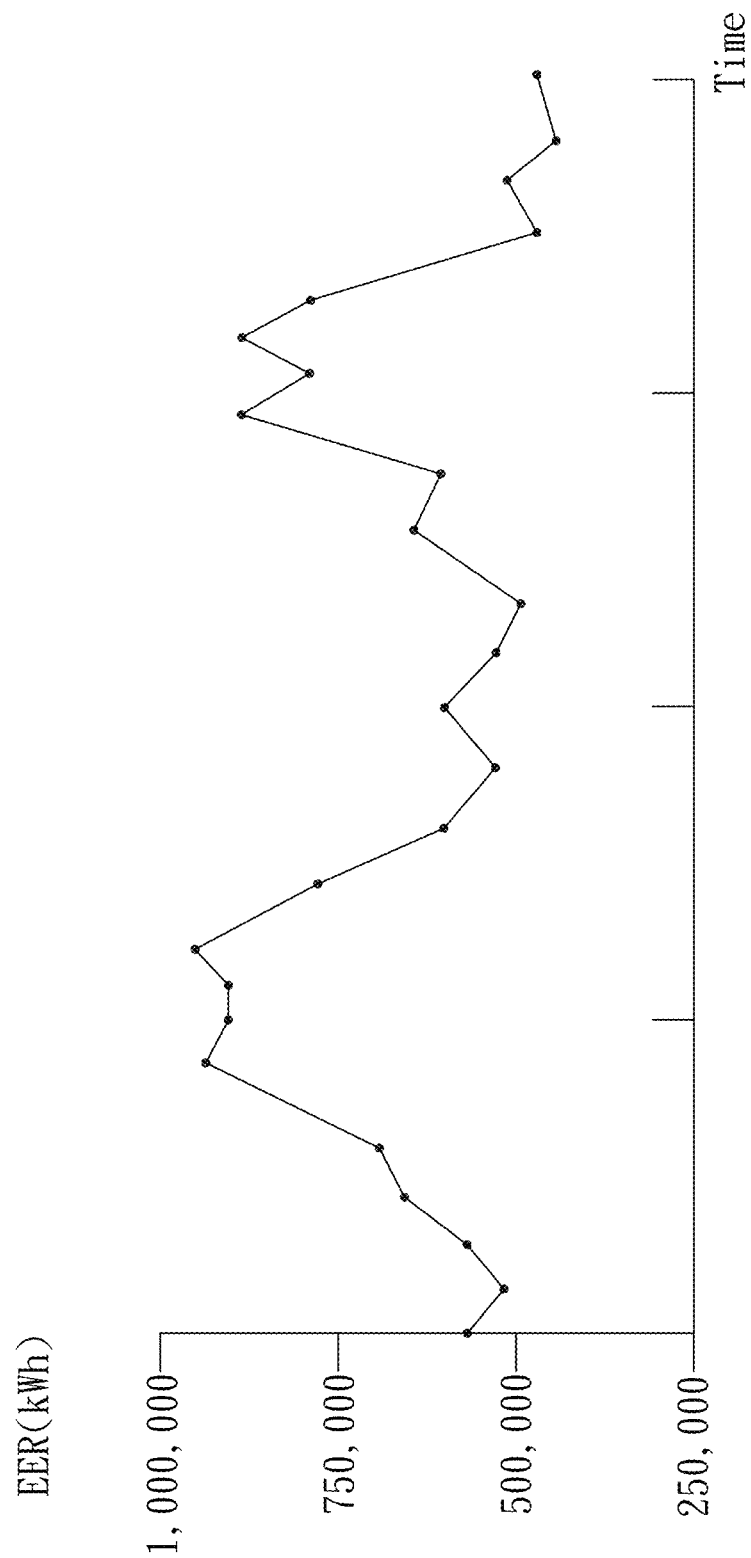
FIGS. 9A to 9D are line charts illustrating comparisons between before and/or after improvement of energy saving in accordance with the present invention.
Figure 9B:
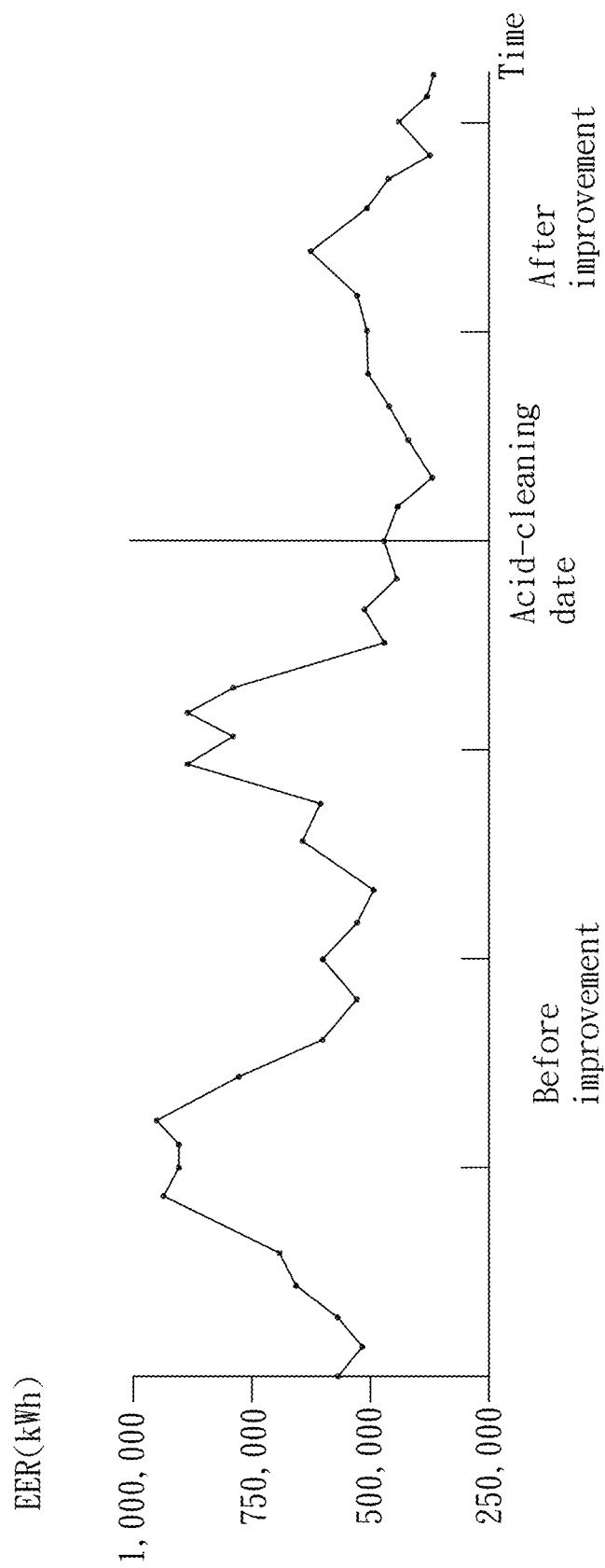
Figure 9C:
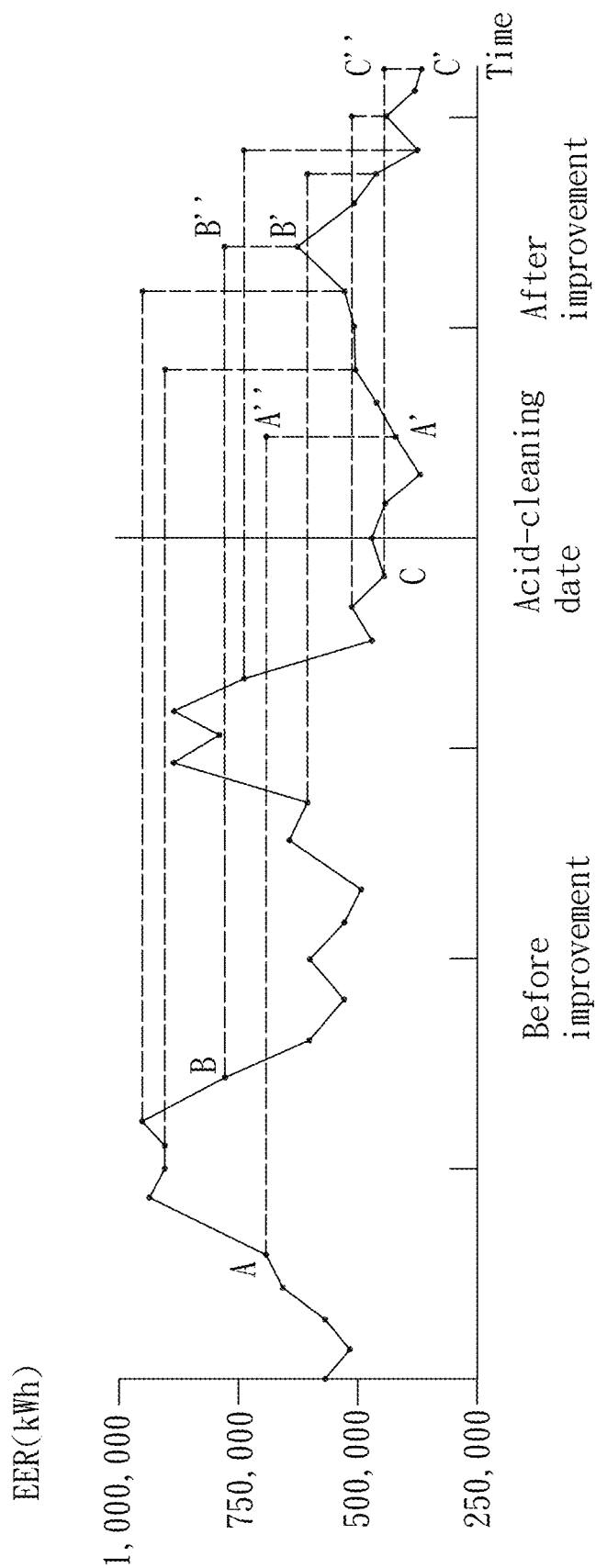
Figure 9D:
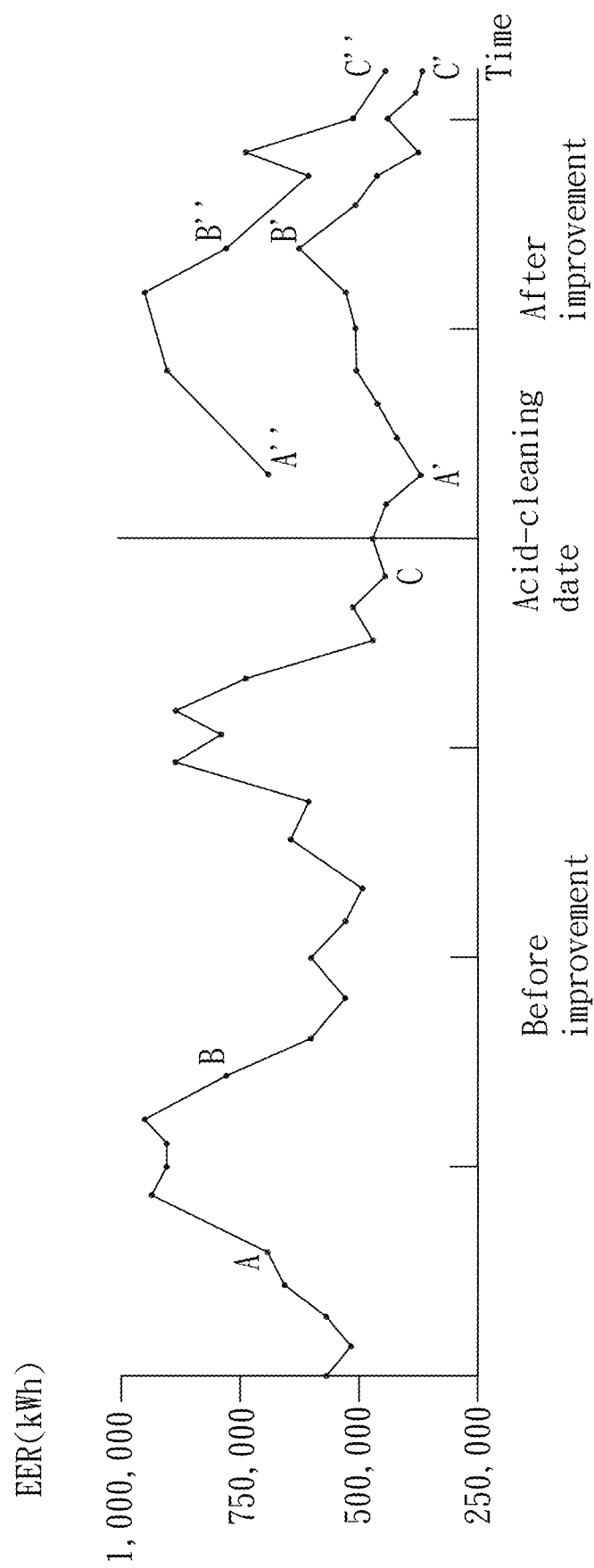

For the actual HVAC chiller unit energy-saving project, the equations described above provide the comparative analysis and product acceptance for energy-saving improvement, the variation of the running EER values during product warranty, and the determination whether to proceed with field dynamic measurement and analysis in compliance with the project contract. In other word, the HVAC engineering project in need of new machine installation, product acceptance and warranty, or the measurement and analysis of energy-saving improvement for old or used machine can be well understood from the curve of the running EER value of the HVAC chiller unit. An example of the measurement and analysis of energy-saving improvement for an old machine is shown in FIG. 9A to FIG. 9D in view of equations 7-1 to 7-3, the curve shown in FIG. 9A is plotted in accordance with project contract made between owners and the energy saving association. If there are eighteen temperature and the load factor groups as operation conditions, then the curve is plotted with eighteen EER agreement values corresponding to eighteen $EERs_{after\ improvement}$, wherein the eighteen EER agreement values are eighteen $EER_{WWHH}$ on the selected day. The curve shown in FIG. 9B is plotted in accordance with the described contract curve ($EERs_{before\ Improvement}$), together with an improved curve of the steady-state running EER value obtained as the daily correct EER value in steps S10 to S30. FIG. 9C shows the agreement value curve section before the energy-saving improvement and a curve section without the energy-saving improvement. As shown, the three steady-state running EER values A, B, C are corresponding with steady-state running EER values A', B', C' after the energy-saving improvement in the same condition of temperature and load factor, to obtain three points of A", B", C". As shown in FIG. 9D, the three points of A", B", C" then are connected in order to obtain the curve without the energy-saving improvement, i.e. the agreement values before the energy-saving improvement corresponding to the agreement values after the energy-saving improvement, or $EER_{WWHH}$. A, B, C are three points of steady-state running EER values before the energy-saving improvement. A', B', C' are three points of steady-state running EER values after the energy-saving improvement. A", B", C" are three points of running EER values (or called $EERs_{WWHH}$) after the energy-saving improvement corresponding to the values without the energy-saving improvement.

Figure 10A:
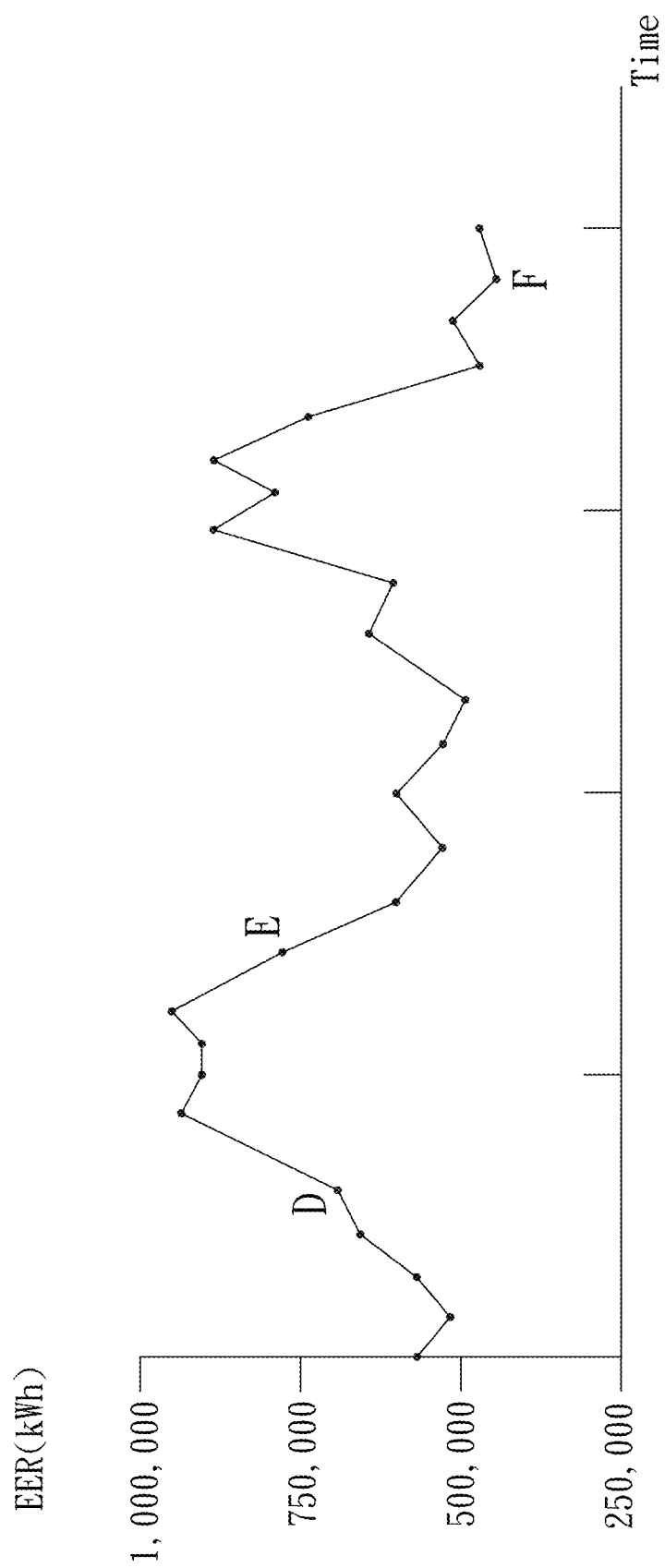
Figure 10C:
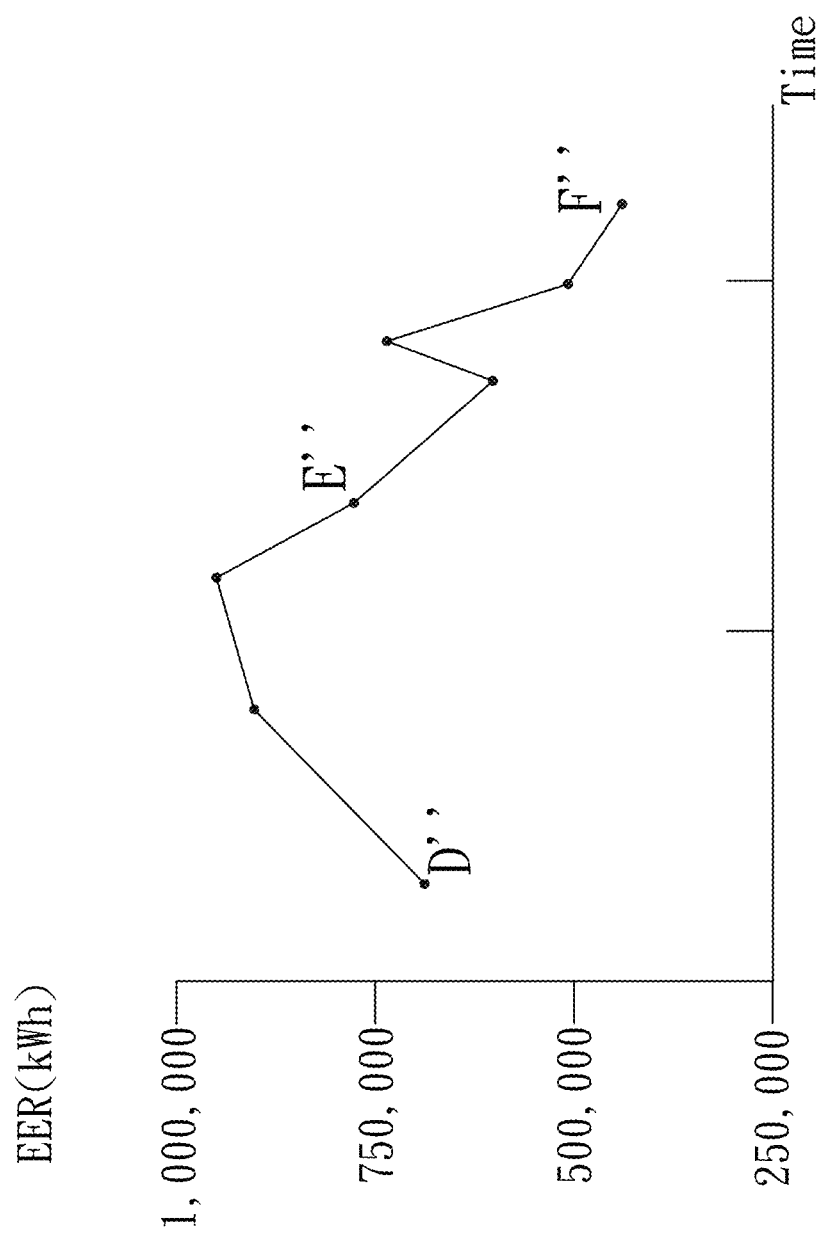

Please referring to FIG. 10A to FIG. 10C, as a reference for the product acceptance, measurement and analysis of a newly installed machine, if surfaces of the heat-exchanger tube of the HVAC chiller unit remain a clean state without fouling, the obtained EER curve complies with the curve plotted with the steady-state running EER values after the energy-saving improvement and is same as that after the energy-saving improvement shown in FIG. 9B, capable of passing the test on product acceptance. When a newly installed HVAC chiller unit is equipped or installed with a poor water treatment equipment which turns the surfaces of the heat-exchanger tube into a fouling state, the verification method is about to be used. In the method, three steady-state running EER values of D, E, F on the curve representing the newly installed machine are corresponded to running EER values of D', E', F' complying with energy saving standard of water treatment in the same condition of temperature and load factor, and then are compared with corresponding values of D", E", F" obtained from the poor water treatment equipment (FIGS. 10C and 10D). As shown, the difference therebetween is obvious. The test on product acceptance does not pass and needs to be optimized and waiting for next retest.

The Taiwan Green Productivity Foundation began to use Energy Service Company (ESCO) mode in 1996 and had reported to Bureau of Energy, Ministry of Economic Affairs, R.O.C. for five years, and had invited the foreign units to help with development of the What Would Have Happened (WWHH, without the energy-saving improvement) and its application to a variety of other devices. Although symposiums and assembly were hold frequently for this purpose, but, its application to the HVAC chiller unit has remained limited strictly to concept so far. The WWHH conversion meter may be an electric meter or a digital electric meter, and it applies in a steady state to LED measurement, domestic or industry power consumption. The measured number is an instantaneous power or an accumulated value such as total electricity consumption for a period of time. However, the instantaneous EER value of the HVAC chiller unit is in a non-steady state, and is not regarded as a basis of measurement or comparative analysis of the EER.

As described, the fouling factor used to determine fouling cumulation degree is still in theoretical sciences and not practically used due to the lack of the heat transfer area. The method of verifying and analyzing energy efficiency ratio (EER) of an HVAC chiller unit in accordance with the present invention uses the fouling index relative to the condenser capacity, as the theoretical fouling factor in order to provide a changing trend of EER and to ensure the correctness of the EER. The fouling index is calculated as follows.

$$\text{fouling index(fi)}=1/(UA)f-1/(UA)c \quad (2)$$

$$UA=m*Cp*\Delta T/\Delta T_{LM}=Q/\Delta T_{LM} \quad (3)$$

$$1/(UA)=\Delta TLM/(m*Cp*\Delta T)=\Delta T_{LM}/Q \quad (4)$$

where U is total heat transfer coefficient; A is heat transfer area; in is cooling water flow or chilled water or brine water flow; Cp is specific heat of water 1 kcal/° C.-kg; $\Delta T_{LM}$ is logarithmic mean temperature difference (LMTD); Q is condenser capacity ($Q_{COND}$ at condenser side) or capacity of the HVAC chiller unit ($Q_{EV}$ at evaporator side).

The use of the fouling index relative to the condenser capacity makes possible composing a curve graph to explain the decrease tendency in heat exchange and the increase tendency in thermal impedance, and is further to be compared with COP and EER, for providing the alternative solution of the theoretical fouling factor and ensuring the correctness of the obtained EER.

Although one HVAC chiller unit is taken as a unit in the present invention, a number of HVAC chiller units may be operating simultaneously in a chiller room of a building, capable of providing the determination whether the energy consumption in relation to the running EER value meets specified criteria. When a number of HVAC chiller units are measured simultaneously, the number of HVAC chiller units should be taken as a group and the building measured should be taken as a unit for the comparative analysis on energy consumption. The cooling and chilling water systems of the HVAC chiller units are configured or operated in a parallel mode, i.e. there are four collector pipes of the cooling and chilling water system respectively connected with entering cooling water pipe, entering chilled water and brine water pipe, leaving cooling water pipe, leaving chilled water and brine water pipe, and there are four connecting pipes in each of the HVAC chiller units respectively connected with entering cooling water pipe, entering chilled water and brine water pipe, leaving cooling water pipe, leaving chilled water and brine water pipe. The four connecting pipes are connected with the four collector pipes. The thirteen functions are a basis of either single or multiple HVAC chiller units and can be used in the chiller room. The chiller room system becomes a basis only when the unit of query analysis is the building. An embodiment of systematic aggregated data is hereby provided for further descriptions, as follows.

The method in accordance with the present invention applies to multiple operating HVAC chiller units. The values for thirty columns of computer database are calculated in accordance with practical operation. A calculation method by adding and other considerations are noted here:

1. Only the operating HVAC chiller units are considered in calculations. Non-operating HVAC chiller units in the duration time are not considered in calculations.
2. Six values respectively shown in the columns of chilled water or brine water flow, cooling water flow, electric current, electric power consumption, condenser capacity and capacity of the HVAC chiller unit are added together.
3. Water quantity complement: there is usually only one water complement meter because of the parallel configuration of cooling towers. However, few of cooling towers have two or more water complement meters made for distinguish of 24-hour and 12-hour operations. The total water consumption is the sum of the water quantities.

4. COP, EER (either in metric system or in British system), kW/RT in accordance with the present invention can not be added directly. The calculations are as follows.

$$COP_{chiller\ room} = \Sigma Q_{EV}/\Sigma kW(Q_{EV}\ in\ kW) \qquad (8\text{-}1)$$

$$EER_{chiller\ room} = COP_{chiller\ room} * 0.86 (in\ kcal/W\text{-}h) \qquad (8\text{-}2)$$

$$kW/RT_{chiller\ room} = \Sigma kW/\Sigma Q_{EV}(Q_{EV}\ in\ RT) \qquad (8\text{-}3)$$

It is noted that the method of the present invention applying to the multiple operating HVAC chiller units of a building does not include the determination whether the standard value or the running EER value is in a steady state. Because there is no way to find out whether a single result is for all operating HVAC chiller units under steady state. After all, the data is under non-steady state if any one of the multiple HVAC chiller units is found under non-steady state.

Further, in the method of the present invention applying to the multiple operating HVAC chiller units of a building, when peak loads respectively in each air conditioning space are different, the ratio of the sum of energy consumption of each HVAC chiller unit to the sum of the daily peak loads for each air conditioning space in the chiller room of the building is considered as an unevenness coefficient. Since the daily peak loads occur in each air conditioning space at different time, the sum of the peak loads is presumably greater than actual value of the system. The equations are as follows.

$$\text{Annual unevenness coefficient}_{building} = \Sigma(RTh)_{year\ in\ total}/\Sigma(RT_{daily\ peak\ loads\ in\ total} * h_{day})_{year\ in\ total} \qquad (9\text{-}1)$$

$$\text{Annual unevenness coefficient}_{building} = \Sigma(RTh)_{year\ in\ total}/\Sigma(RT_{monthly\ peak\ loads\ in\ total} * h_{month})_{year\ in\ total} \qquad (9\text{-}2)$$

wherein there are two definitions for annual unevenness coefficient. One is the ratio of the sum of energy consumption of the chiller units in the chiller room ($RTh_{year\ in\ total}$) sum of the daily peak loads ($RTh_{daily\ peak\ loads\ in\ total}$)(as illustrated in above equation (9-1)). The other is the ratio of the sum of energy consumption of chiller units in the chiller room ($RTh_{year\ in\ total}$) to the sum of the monthly peak loads (as illustrated in above equation (9-2)). The unevenness coefficient for every month, season and half of a year has the same definition. From the definitions, the dividends are the sum of the daily peak loads or the sum of the monthly peak loads, respectively.

In the application to the multiple operating HVAC chiller units in the chiller room of a building, the total energy consumption whether as divisor or dividend, refers to the building. Otherwise it may affect the power-on hours and the RT values to make the unevenness coefficient become meaningless if users activate different HVAC chiller units in the same building. However, the total RT value is proportional to conservation of energy and is not affected by the activation of the different HVAC chiller units. The aberration coefficient is able to show the proportional relation between the annual total RT value and the load peak values.

Accordingly, the technical effects and advantages are described as follows.

First, the method in accordance with the present invention provides innovation of the HVAC chiller unit in categorizing integer temperatures, tenfold load factors and recognizing steady-state data via computer equipments including but not within programmable logic controllers (PLC), human machine interfaces (HMI) and tablet computers (Pad), etc. or any calculation, in order to provide a comparative analysis and software applications as a breakthrough for conventional air conditioning industry. The steady-state data may further combine with a specific integer temperature and tenfold load factor group to facilitate advanced inventions in relation to establishment of standard and running values, filling up the missing value, WWHH conversion meter, and improvement on total energy consumption, as an integration of energy conservation technology for the HVAC chiller unit. In other word, the method in accordance with the present invention contributes to obtaining correct daily running EER values that make possible the comparative analysis for the distribution of energy consumption in the same condition of the temperature and load factor in order to establish the smallest EER values for every week, month, season, year, half a year and to check the management index value for the implement of energy-saving tasks. The HVAC chiller unit reported in energy audits of the Ministry of Economic Affairs as the most energy-consumption equipment is thus provided in the present invention with a new management model consisting of the correct EER values and the management index value.

Second, the present invention provides an individual standard value each year since each client may have different acid-cleaning date. The correctness of the individual standard value should be consistent with the client's actual situation. Another advantage of the present invention is a rapid calculation for the instant result, which is not provided in prior art because of the lack of relative computer equipments. Further, the steady-state and non-steady state data obtained in query may be exported in Excel form by requirements for owner's reference to reduce the project contract dispute. It is found more advance and acceptable than any other used tool in this field.

Third, the present invention provides a calculation of the fouling index by using the UA and 1/(UA) values in replacement of theoretical fouling factor because the theoretical fouling factor can not be actually obtained in the lack of the heat transfer area. The calculated standard and running EER values by this method seem more logical and acceptable to the public and more beneficial to resolve the conflicts and disputations in commerce activities, especially to the conventional HVAC chiller unit with high energy consumption and sharp EER plunge resulted from fouling situations. The present invention is thus to raise energy conservation gains as well.

Fourth, there must be missing values for the annual field measurement, which may not only cause the conflicts and disputations in commerce activities, but also the failure to determine whether the energy consumption situation is improved or not after an attempt thereof is made. To resolve the conflicts and disputations in commerce activities and to let the owner know if the current energy consumption is appropriate, the technique of filling up the missing value is hereby provided in the present invention.

Fifth, for the comparative analysis of the standard and running EER values, the decreased magnitude of the running EER value in influence of foulings is shown as a steep or flat trendline in the curve graph, which indicates whether the descending rate of the running EER value is acceptable, which is not available in the prior art. Besides, an allowable decreased amplitude for each month or year may be established in the purpose of monitoring.

Sixth, for trend analysis, there are 1440 records per day and 43200 records per month at the rate of one record per minute. In the data query of a day or a month, there is a huge amount of data making the trend analysis difficult. The present invention thus provides the selection of any of the described thirty items, and the graph able to show the corresponding curve(s) according to the selection. If there are thirty curves shown in a same graph, it would be difficult to recognize each curve clearly due to overlap and entanglement, and also difficult to show the values clearly in a wide range of tolerance, i.e. if the UA value approaches to $1*10^5$, the $1/(UA)$ value is about $1*10^{-5}$. However, the entering and leaving water temperatures do not have to be shown as single digit and two digits at the same time. Therefore, the selection of item(s) is provided in the present invention which allows the optional selections to show the curve trend, which provides high convenience and affinity for users.

Seventh, for the field innovation applications in compliance with the national CNS Standard and the international AHRI Standard, the program in accordance with the present invention writes CNS/AHRI Standard conditions, overload conditions, partial overload conditions, specification of the rated fouling factor allowance simulation in temperature, applications of IPLV, applications of NPLV and applications of APLV. Bulk data handling techniques may be further utilized to provide Taiwan with IPLV weightings as reference for energy saving policy-making by the Ministry of Economic Affairs.

Eighth, the present invention provides a software program designed in accordance with practical operation conditions via programmable logic controllers (PLC), human machine interfaces (HMI) and tablet computers (Pad), etc. or any calculation. It allows operators to use programmable keys to input their query terms in a designated procedures. As soon as a certain demand condition is input in a blank needed to be filled out, the program proceeds to calculate the according results right away for convenience to use.

Ninth, the present invention provides the HVAC chiller unit with a bunch of data for comparative analysis and field verification in the annual scale, such as operation capability, performance and EER values. In addition, the water treatment technology adopted in the present invention provides a particular function of differentiating the quality of water such as recognizing qualified water, which belongs to an energy-saving level as well.

Accordingly, a method of verifying and analyzing energy efficiency ratio (EER) of an HVAC chiller unit in accordance with the present invention includes periodically receiving and storing the dynamic EER data, and selecting certain integer temperatures and tenfold load factors to obtain a consumption rate group consisting of COP, EER and kW/RT for each integer temperature and each tenfold load factor, and incorporating an entering water temperature and a leaving water temperature of the HVAC chiller unit to generate a specific integer temperature and tenfold load factor group based on climatic conditions and running load factors of the HVAC chiller unit, for example, selecting integer temperatures ranged between ±0.5° C. and tenfold load factors ranged between ±5%, along with an integer leaving chilled water and brine water temperature of a brine chilled unit between −7~0° C. and 3~15° C. to generate the specific integer temperature and tenfold load factor group; calculating the EER values to obtain and store standard EER values and running EER values; dividing one of the obtained running EER values by a corresponding standard value in terms of percentage to provide a correct changing trend of the EER values in a curve graph for comparative analysis of the running EER values in order to determine whether an energy consumption meets specified criteria. so that correct EER values can be provided in analysis of a running data during four seasons a year, i.e. spring, summer, autumn and winter, or a day, i.e. morning, noon and night under both kinds of steady and non-steady state conditions of all chiller operation, as a basis of comparison of calculations, and resulting amplitude ratios between before and after the energy-saving improvement, as well as of totally saved energy.

The above description is made with respect to the preferred embodiments of the present invention and for those skilled in the art, it is possible to make a variety of modifications and changes to the above-described specific embodiments without departing from the scope and spirit of the present invention. For example, the method of the present invention is applicable to web services or to a single device in connection to several devices for extended use, e.g. at least one HVAC chiller unit of one chiller room in connection to at least one HVAC chiller unit of multiple other chiller rooms. All these modifications and changes should be considered within the scope of the present invention as defined in the appended claims.

What is claimed is:

1. A method of verifying and analyzing energy efficiency ratio (EER) of an HVAC chiller unit, providing verification and analysis of any kind or type of water-cooled HVAC chiller units via computer equipments at least including programmable logic controllers (PLC), human machine interfaces (HMI) and tablet computers (Pad) or any calculation to build daily steady-state data and non-steady state data out of a field dynamic EER data in annual scale that is subject to the dynamic changes in temperatures and load factors during four seasons of a year, or morning, noon and night of a day, or in season or out of season mapped to business needs under both kinds of steady and non-steady state conditions of all chiller operation, and to determine pre-set management index values for each week, month, season, half of a year or a year, the method including:

periodically receiving and storing the field dynamic EER data, and then building a specific integer temperature and tenfold load factor group, afterwards to obtain a corresponding consumption rate group consisting of coefficient of performance (COP), EER and kW/RT by selecting each integer temperature(s) and tenfold load factor(s), and incorporating an entering water temperature and a leaving water temperature of the HVAC chiller unit to generate the specific integer temperature(s) and tenfold load factor(s) group based on climatic conditions and running load factors of the HVAC chiller unit, wherein COP is an coefficient of performance of the HVAC chiller unit (dimensionless or in kW/kW);

taking a certain percentage ranges from the specific integer temperature(s) and tenfold load factor(s) group as a selection basis to calculate standard EER values and running EER values, the standard EER values and the running EER values both being steady state values, the standard EER values further proceeding with a rated fouling factor allowance simulation, and storing the standard EER values and the running EER values after the rated fouling factor allowance simulation, wherein the running EER values are field measured (in situ) under fouling state;

dividing one after another each of the running EER values by a corresponding standard EER value under a condition of same cooling water integer temperatures, tenfold load factors and chilled water and brine water (or refrigerant) integer temperatures to obtain a percentage which provides a comparative analysis of the running EER values to determine whether an energy consumption calculated from the standard EER values and the running EER values meets specified criteria, as a basis of comparison of calculations, and resulting amplitude ratios between before and after an energy-saving improvement and of totally saved energy, and then showing results of the comparison on a computer screen.

2. The method of verifying and analyzing energy efficiency ratio (EER) of an HVAC chiller unit as claimed in claim 1, wherein the specific integer temperature and tenfold load factor group consists of integer temperature(s) and tenfold load factor(s) established based on the climatic conditions in full year or a season of spring, summer, autumn, winter and the running load factors of the HVAC chiller unit, and the entering and leaving water temperatures are individual integer temperatures, and the selected integer temperatures and tenfold load factors being organized in various number of groups with various tolerances organized in evenly and unevenly distributions.

3. The method of verifying and analyzing energy efficiency ratio (EER) of an HVAC chiller unit as claimed in claim 2, wherein at least a temperature and a load factor for each season (spring, summer, autumn and winter) are selected, the selected temperature being an integer temperature with tolerance of 1° C. or less than 1° C. corresponding to an entering cooling water temperature of the HVAC chiller unit, the load factors being expressed in percentage corresponding to the selected temperature, the percentage of the load factor being selected as a tenfold load factor having tolerance of 10% or less than 10%, a brine chiller unit of the HVAC chiller unit obtaining an integer temperature of a leaving chilled water and brine water temperature at −7° C.~0° C. and 3° C.~15° C. (only as example to explain) with tolerance of 1° C. or less than 1° C., the selected temperatures and tenfold load factors being organized in various number of groups with various tolerances, or organized in evenly and unevenly distributions.

4. The method of verifying and analyzing energy efficiency ratio (EER) of an HVAC chiller unit as claimed in claim 2, wherein the specific integer temperature and tenfold load factor group consists of thirty-six combinations which are calculated by six integer entering cooling water temperatures, including 25° C., 26° C., 27° C., 28° C., 29° C., 30° C. each with tolerance of 1° C. or less than 1° C., multiplied by the one integer leaving chilled water and brine water temperature of the brine chiller unit between −7° C.~0° C. and 3° C.~15° C., such as 7° C. with tolerance of 1° C. or less than 1° C., further multiplied by six tenfold load factors, including 50%, 60%, 70%, 80%, 90%, 100% each with tolerance of 10% or less than 10%, the selected temperatures and tenfold load factors being organized in various number of groups with various tolerances, or organized in evenly and unevenly distributions.

5. The method of verifying and analyzing energy efficiency ratio (EER) of an HVAC chiller unit as claimed in claim 1, wherein a specification of the certain percentage ranges is carried out by a mean-value steady-state screening method or a thermal balance steady-state screening method.

6. The method of verifying and analyzing energy efficiency ratio (EER) of an HVAC chiller unit as claimed in claim 5, wherein the mean-value steady-state screening method produces standard EER values and the running EER values as integer percentages or non integer percentages in tolerance of 10% or less than 10%, and the thermal balance steady-state screening method produces standard EER values and the running EER values as integer percentages or non integer percentages in tolerance of 10% or less than 10%.

7. The method of verifying and analyzing energy efficiency ratio (EER) of an HVAC chiller unit as claimed in claim 6, wherein the mean-value steady-state screening method comprises initially calculating a first mean of the field dynamic EER data according to temperature and load factor conditions, then after removing the field dynamic EER data outside an absolute value difference of 25%, taking the field dynamic EER data within an absolute value difference of 25% as a second mean of the field dynamic EER data, and further narrowing the absolute value difference to 10% and 5% as being a third mean and a fourth mean of the field dynamic EER data, wherein the fourth mean of the field dynamic EER data is taken as a basis of the standard EER values and the running EER values, the method further contains setting an operation data of the standard EER values and the running EER values as steady state data, while setting a removed operation data in previous three times as non-steady state data, the thermal balance steady-state screening method containing an equation: $(+W_{input} - q_{ev})/q_c * 100\%$, where $q_{ev}$ is refrigerating capacity; $W_{input}$ is energy of input work of compressor; $q_c$ is heat transferred from condenser to cooling water, the thermal balance steady-state screening method comprising initially removing values outside an absolute value difference of 5%, listing the removed values outside an absolute value difference of 5% as the non-steady state data and the values within the absolute value difference of 5% as the steady state data, grouping the steady state data to provide a same amount of groups in the specific integer temperature and tenfold load factor group, averaging the steady state data in each group to obtain a selected standard EER value and running EER value.

8. The method of verifying and analyzing energy efficiency ratio (EER) of an HVAC chiller unit as claimed in claim 1, wherein the selected standard EER value is defined as an absolute standard EER value, a relative standard EER value or an agreement value depending upon the fouling condition, wherein the absolute standard EER value is measured in a clean state of a surface of a heat-exchanger tube of the HVAC chiller unit without fouling, the relative standard EER value is obtained by correcting the absolute standard EER value based on a fouling state to the steady state data, and the agreement value (made between owner(s) and energy saving contractor(s)) is measured in the fouling state of the surface of the heat-exchanger tube of the HVAC chiller unit.

9. The method of verifying and analyzing energy efficiency ratio (EER) of an HVAC chiller unit as claimed in claim 1, wherein the results of the comparative analysis of the running EER values shown on the computer screen come out with a combination of curve sections of the running EER values illustrating a variation trend of the running EER values, wherein the curve of the running EER values comprises a curve section of agreement values before energy-saving performance improved, a curve section consisting of the running EER values plotted after energy-saving performance improved and another curve section consisting of the converted running EER values for which if energy-saving performance has not been improved called a WWHH conversion meter, both the agreement value and the running EER value being the steady-state data, the combination of curve sections of the running EER values being obtained by equations as follows:

$$\%_{improved\ amplitude\ of\ each\ temperature\ and\ load\ factor} = (EER_{after\ improvement} - EER_{WWHH}) \div EER_{after\ improvement} * 100\% \qquad (A)$$

$$\%_{daily\ improvement} = [\Sigma_{36\ values}(\%_{improved\ amplitude\ of\ each\ temperature\ and\ load\ factor})]_{average} \quad (B)$$

$$\text{A total improved electrical consumption} = \Sigma_{current\ period}(kWh_{after\ improvement} * \%_{daily\ improvement})_{selected\ day} \quad (C)$$

where $EER_{after\ improvement}$ is a daily running EER value after energy-saving performance improved; $EER_{WWHH}$ is an converted agreement value corresponding to same temperature and load factor as improved running EER value for which the energy-saving performance has not been improved; $\%_{improved\ amplitude\ of\ each\ temperature\ and\ load\ factor}$ is a percentage illustrating an improvement of each temperature and load factor; $\%_{daily\ improvement}$ is a percentage illustrating an average of daily improvement; $kWh_{after\ improvement}$ is a total electricity consumption on a selected day after energy-saving performance improved;

wherein a dynamic energy consumption rate data on a selected day before energy-saving performance improved is calculated to be the agreement value, the daily energy consumption rate data after energy-saving performance improved is calculated to be the running EER value, the agreement value and the running EER value being further compared with a converted agreement value ($EER_{WWHH}$) in the same condition of temperature and load factor as the daily running EER value ($EER_{after\ improvement}$) to obtain the improvement of each temperature and load factor ($\%_{improved\ amplitude\ of\ each\ temperature\ and\ load\ factor}$) as illustrated in the equation (A) and to obtain the average of daily improvement ($\%_{daily\ improvement}$) as illustrated in the equation (B), then the percentage ($\%_{daily\ improvement}$) being further multiplied with the total electricity consumption on the selected day ($kWh_{after\ improvement}$) to obtain the total improved electrical consumption wherein the percentage ($\%_{daily\ improvement}$) is related to the total electricity consumption of the selected day with the percentage ($\%_{daily\ improvement}$) based on the running EER value of the selected day after improvement instead of the agreement value, and wherein the steady state data including the running EER value takes days as scale unit, and the total improved electrical consumption ($\Sigma_{current\ period}$) is obtained by daily accumulations by the equation (C), each $EER_{WWHH}$ being the corresponding agreement value in a condition of a same integer temperature and a same tenfold load factor as on the date of improved running EER value for which the energy-saving performance has not been improved, and the $\%_{daily\ improvement}$ being the percentage illustrating the average of daily improvement, so that whether an energy consumption meets specified criteria is determined depending upon the improved running EER value directed to the $EER_{WWHH}$ corresponding to the same integer temperature and the same tenfold load factor as the comparison base.

10. The method of verifying and analyzing energy efficiency ratio (EER) of an HVAC chiller unit as claimed in claim 1, further comprising a regular calibration of temperature measurement by modifying the entering cooling and chiller water and brine water temperatures to be consistent with the leaving cooling and chilled water and brine water temperature at a time after the HVAC chiller unit is shut down or before the HVAC chiller unit is turned on in order to let a difference of the temperatures be zero.

11. The method of verifying and analyzing energy efficiency ratio (EER) of an HVAC chiller unit as claimed in claim 8, wherein a temperature of the specific integer temperature and tenfold load factor group is further corrected by a factor of 0.6° C. as a rated fouling factor allowance simulation specified in Chinese National Standards (CNS) 12575 in 2007, by a factor of 1.2° C. as another rated fouling factor allowance simulation set up by the Air-Conditioning, Heating and Refrigeration Institute (AHRI) Standard in 1988, or by a factor of 0.6° C. as a rated fouling factor allowance simulation specified in AHRI Standard 550 so far in 1992, or by a factor of an integer or non-integer number within 3° C.

12. The method of verifying and analyzing energy efficiency ratio (EER) of an HVAC chiller unit as claimed in claim 1, after the step of calculating to obtain the standard EER values, further comprising a step of filling up missing values which includes finding the integer temperature and tenfold load factor of a missing value in the standard EER values, searching by date sequence in accordance with the specific integer temperature and tenfold load factor group for a first existing running EER value and a corresponding percentage of a date, and dividing the running EER value by a percentage of the date so as to obtain an alternative standard EER value in a same condition of temperature and load factor.

13. The method of verifying and analyzing energy efficiency ratio (EER) of an HVAC chiller unit as claimed in claim 1, wherein said periodically receiving and storing the field dynamic EER data is receiving each dataset at 1, 2, 3, 4, 5, 6, 10, 12, 15, 20, 30 or 60 minutes intervals.

14. The method of verifying and analyzing energy efficiency ratio (EER) of an HVAC chiller unit as claimed in claim 1, further comprising calculating a fouling index used to replace theoretical fouling factor in order to determine a fouling degree precisely, calculations of the fouling index including:

fouling index=$1/(UA)_f - 1/(UA)_c$;

$UA = m*Cp*\Delta T/\Delta T_{LM} = Q/\Delta T_{LM}$;

$1/(UA) = \Delta T_{LM}/(m*Cp*\Delta T) = \Delta T_{LM}/Q$;

where U is total heat transfer coefficient; A is heat transfer area; m is cooling water flow or chilled water or brine water flow; Cp is specific heat of water 1 kcal/° C.-kg; $\Delta T_{LM}$ is logarithmic mean temperature difference (LMTD); Q is a condenser capacity ($Q_{COND}$ at a condenser side) or a capacity of the HVAC chiller unit ($Q_{EV}$ at an evaporator side); subscripts f and c represent fouling state and clean state (non fouling state), respectively;

wherein the UA and 1/(UA) values along with the condenser capacity provide an EER changing trend to ensure the correctness of obtained EER values.

15. The method of verifying and analyzing energy efficiency ratio (EER) of an HVAC chiller unit as claimed in claim 1, further providing an integrated part-load value (IPLV) with A, B, C, D EER values for measurement of field running EER values, wherein the A, B, C, D EER values are steady-state values respectively in temperature and load factor conditions of 30° C. 100%, 24° C. 75%, 19° C. 50%, 19° C. 25% recited in Chinese National Standards (CNS) 12575 or in AHRI Standard 550, the IPLV being calculated by an equation as follows:

IPLV=WF100%×*A*+WF75%×*B*+WF50%×*C*+WF25%×*D* where a weighted factor of WF100% corresponds to the entering cooling water temperature greater than or equal to 30° C. with a running load factor equal to 100%, a weighted factor of WF75% corresponds to the entering cooling water temperature greater than or equal to 24° C. and smaller than 30° C. with a running load factor greater than or equal to 75% and smaller than 100%, a weighted factor WF50% corresponds to the entering cooling water temperature greater than or equal to 19° C. and smaller than 24° C. with a running load factor greater than or equal to 50% and smaller than 75%, a weighted factor of WF25% corresponds to the entering cooling water temperature greater than or equal to 19° C. and smaller than 24° C. with a running load factor greater than or equal to 25% and smaller than 50%, wherein the weighted factor of each area of temperature and load factor is a percentage of available data amount of each of these areas of temperature and load factor to total data amount of all four areas of temperature and load factor, the A, B, C, D EER values being substituted into the equation, so that the IPLV is determined to show a distribution of energy consumption rate in operation and efficiency of the HVAC chiller unit in an annual scale.

16. The method of verifying and analyzing energy efficiency ratio (EER) of an HVAC chiller unit as claimed in claim 1, further providing a non-standard part load value (NPLV) and an application part load value (APLV) with A, B, C, D, E, F EER values for measurement of field running EER values, wherein the A, B, C, D, E, F EER values are steady-state values respectively in temperature and load factor conditions of 30° C. 100%, 29° C. 90%, 28° C. 80%, 27° C. 70%, 26° C. 60%, 25° C. 50% similar to a case in Chinese National Standards (CNS) 12575 or in AHRI Standard 550, the APLV(NPLV) being calculated by an equation as follows:

$$APLV(NPLV)=WF100\%\times A+WF90\%\times B+WF80\%\times C+WF70\%\times D+WF60\%\times E+WF50\%\times F$$

where a weighted factor of WF100% corresponds to the entering cooling water temperature greater than or equal to 30° C. with a running load factor equal to 100%, a weighted factor of WF90% corresponds to the entering cooling water temperature greater than or equal to 29° C. and smaller than 30° C. with a running load factor greater than or equal to 90% and smaller than 100%, a weighted factor of WF80% corresponds to the entering cooling water temperature greater than or equal to 28° C. and smaller than 29° C. with a running load factor greater than or equal to 80% and smaller than 90%, a weighted factor of WF70% corresponds to the entering cooling water temperature greater than or equal to 27° C. and smaller than 28° C. with a running load factor greater than or equal to 70% and smaller than 80%, a weighted factor of WF60% corresponds to the entering cooling water temperature greater than or equal to 26° C. and smaller than 27° C. and the running load factor greater than or equal to 60% and smaller than 70%, a weighted factor of WF50% corresponds to the entering cooling water temperature greater than or equal to 25° C. and smaller than 26° C. with a running load factor greater than or equal to 50% and smaller than 60%, wherein the weighted factor of each area of temperature and load factor is a percentage of available data amount of each of these areas of temperature and load factor to total data amount of all six areas of temperature and load factor, the A, B, C, D, E, F running EER values and the weighted factors of WF100%, WF90%, WF80%, WF70%, WF60% and WF50% are then substituted into the equation, so that the APLV(NPLV) is determined to show a distribution of energy consumption rate in operation and efficiency of the HVAC chiller unit in an annual scale.

17. The method of verifying and analyzing energy efficiency ratio (EER) of an HVAC chiller unit as claimed in claim 1, further comprising a comparative analysis of an aggregation of HVAC chiller units at a chiller room of a building, wherein a running EER value of the aggregation of the HVAC chiller units is calculated to obtain a sum of energy consumption for the comparison in analysis; wherein the sum of energy consumption is calculated as follows:

$$COP_{chiller\ room}=\Sigma Q_{EV}/\Sigma kW$$

$$EER_{chiller\ room}(\text{in kcal/W-h})=COP_{chiller\ room}*0.86$$

$$kW/RT_{chiller\ room}=\Sigma kW/\Sigma Q_{EV}$$

where $Q_{EV}$ is a capacity of the HVAC chiller unit in kW, kcal/h or RT; kW is a measured electric power; RT is a refrigeration ton; COP is an coefficient of performance of the HVAC chiller unit (non-dimensional or in kW/kW); EER is an energy efficiency ratio in kcal/h-W or BTU/h-W;

a sum of daily peak loads of the chiller room is calculated as follows:

$$\text{annual unevenness coefficient}_{building}=\Sigma(RTh)_{year\ in\ total}/\Sigma(RT_{daily\ peak\ loads\ in\ total}*h_{day})_{year\ in\ total}$$

where $(RTh)_{year\ in\ total}$ is refrigeration ton-hour at the chiller room for a year in total; $RT_{daily\ peak\ in\ total}$ is $RT_{peak}$ of each day; $h_{day}$ is operating hours of the day;

$$\text{annual unevenness coefficient}_{building}=\Sigma(RTh)_{year\ in\ total}/\Sigma(RT_{monthly\ peak\ loads\ in\ total}*h_{month})_{year\ in\ total}$$

where $RT_{monthly\ peak\ loads\ in\ total}$ is the $RT_{peak}$ of each month of the chiller room; $h_{month}$ is operating hours of the month.

18. A method of verifying and analyzing energy efficiency ratio (EER) of an HVAC chiller unit, providing verification and analysis of any kind or type of water-cooled HVAC chiller units via computer equipments at least including programmable logic controllers (PLC), human machine interfaces (HMI) and tablet computers (Pad) or any calculation to build daily steady-state data and non-steady state data out of a field dynamic EER data in annual scale that is subject to the dynamic changes in temperatures and load factors during four seasons of a year, or morning, noon and night of a day, or in season or out of season mapped to business needs under both kinds of steady and non-steady state conditions of all chiller operation, and to determine pre-set management index values for each week, month, season, half of a year or a year, the method including:

periodically receiving and storing the dynamic EER data in which an entering water temperature and a leaving water temperature of the HVAC chiller unit are regularly modified as same temperatures, and then building a specific integer temperature and tenfold load factor group, afterwards to obtain a corresponding consumption rate group consisting of coefficient of performance (COP), EER and kW/RT by selecting each integer temperature(s) and tenfold load factor(s), and incorporating the entering water temperature and the leaving water temperature of the HVAC chiller unit to generate the specific integer temperature(s) and load factor(s) group based on climatic conditions and running load factors of the HVAC chiller unit, wherein COP is an coefficient of performance of the HVAC chiller unit (dimensionless or in kW/kW);

taking a certain percentage ranges from the specific integer temperature(s) and tenfold load factor(s) group as a selection basis to calculate standard EER values and running EER values, the standard EER values and the running EER values both being steady state values, the standard EER values further proceeding with a rated fouling factor allowance simulation, and storing the standard EER values and running EER values after the rated fouling factor allowance simulation, wherein the running EER values are field measured (in situ) under fouling state;

dividing one after another each of the running EER values by a corresponding standard EER value under a condition of same cooling water integer temperatures, tenfold load factors and chilled water and brine water (or refrigerant) integer temperatures to obtain a percentage which provides a comparative analysis of the running EER values to determine whether an energy consumption calculated from the standard EER values and the running EER values meets specified criteria, as a basis of comparison of calculations, and resulting amplitude ratios between before and after an energy-saving improvement and of totally saved energy, and then showing results of the comparison on a computer screen.

19. A method of verifying and analyzing energy efficiency ratio (EER) of an HVAC chiller unit, providing verification and analysis of any kind or type of water-cooled HVAC chiller units via computer equipments at least including programmable logic controllers (PLC), human machine interfaces (HMI) and tablet computers (Pad) or any calculation to build daily steady-state data and non-steady state data out of a field dynamic EER data in annual scale that is subject to the dynamic changes in temperatures and load factors during four seasons a year, or morning, noon and night of a day, or in season or out of season mapped to business needs under both kinds of steady and non-steady state conditions of all chiller operation, and to determine pre-set management index values for each week, month, season, half of a year or a year and determine whether an energy consumption according to the running of multiple operating HVAC chiller units at a chiller room of a building meets specified criteria, the method including:

periodically receiving and storing the field dynamic EER data of each operating HVAC chiller unit at the chiller room of the building, and then building a specific integer temperature and tenfold load factor group, afterwards to obtain a corresponding consumption rate group consisting of coefficient of performance (COP), EER and kW/RT by selecting each integer temperature(s) and each tenfold load factor(s), and incorporating an entering water temperature and a leaving water temperature of the HVAC chiller unit to generate the specific integer temperature(s) and load factor(s) group based on climatic conditions and running load factors of the HVAC chiller unit;

taking a certain percentage ranges from the specific integer temperature(s) and tenfold load factor(s) group as a selection basis to calculate standard EER values and running EER values, the standard EER values and the running EER values both being steady state values, the standard EER values further proceeding with a rated fouling factor allowance simulation, and storing the standard EER values and the running EER values after the rated fouling factor allowance simulation, wherein the running EER values are field measured (in situ) under fouling state;

dividing one after another each of the running EER values obtained from each operating HVAC chiller unit at the chiller room of the building by a corresponding standard EER value under a condition of same cooling water integer temperatures, tenfold load factors and chilled water and brine water (or refrigerant) integer temperatures to obtain a percentage which provides a comparative analysis of the running EER values, and then displayed on a computer screen; and calculating a ratio of a sum of energy consumption of each HVAC chiller unit to a sum of daily peak loads for each air conditioning space at the chiller room of the building in accordance with the running EER values to obtain an unevenness coefficient to determine whether an energy consumption meets specified criteria, as a basis of comparison of calculations, and resulting amplitude ratios between before and after an energy-saving improvement for each day, month and year and of totally saved energy; wherein the sum of energy consumption is calculated as follows:

$$COP_{chiller\ room} = \Sigma Q_{EV}/\Sigma kW$$

$$EER_{chiller\ room}(\text{in kcal/W-h}) = COP_{chiller\ room}*0.86$$

$$kW/RT_{chiller\ room} = \Sigma kW/\Sigma Q_{EV}$$

where $Q_{EV}$ is a capacity of the HVAC chiller unit in kW, kcal/h or RT; kW is a measured electric power; RT is a refrigeration ton; COP is an coefficient of performance of the HVAC chiller unit (dimensionless or in kW/kW); EER is an energy efficiency ratio in kcal/h-W or BTU/h-W;

the sum of daily peak loads is calculated as follows:

$$\text{annual unevenness coefficient}_{building} = \Sigma(RTh)_{year\ in\ total}/\Sigma(RT_{daily\ peak\ loads\ in\ total}*h_{day})_{year\ in\ total}$$

where $(RTh)_{year\ in\ total}$ is refrigeration ton-hour at the chiller room for a year in total; $RT_{daily\ peak\ in\ total}$ is $RT_{peak}$ of each day; $h_{day}$ is operating hours of the day;

$$\text{annual unevenness coefficient}_{building} = \Sigma(RTh)_{year\ in\ total}/\Sigma(RT_{monthly\ peak\ loads\ in\ total}*h_{month})_{year\ in\ total}$$

where $RT_{monthly\ peak\ loads\ in\ total}$ is the $RT_{peak}$ of each month of the chiller room; $h_{month}$ is operating hours of the month.

* * * * *